United States Patent [19]
Hayasaki et al.

[11] Patent Number: 6,145,951
[45] Date of Patent: Nov. 14, 2000

[54] METHOD AND APPARATUS FOR CORRECTING PRINTHEAD, PRINTHEAD CORRECTED BY THIS APPARATUS, AND PRINTING APPARATUS USING THIS PRINTHEAD

[75] Inventors: Kimiyuki Hayasaki, Yokohama; Masaki Inaba, Kawasaki, both of Japan

[73] Assignee: Canon Kabushiki Kaisha, Tokyo, Japan

[21] Appl. No.: 08/604,545

[22] Filed: Feb. 21, 1996

[30] Foreign Application Priority Data

Feb. 23, 1995 [JP] Japan .................................. 7-035337

[51] Int. Cl.[7] .................................. B41J 29/393
[52] U.S. Cl. .................... 347/19; 347/133; 347/195; 347/196
[58] Field of Search .................. 347/14, 15, 19, 347/133, 195, 196, 251; 358/504, 406, 298

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,723,129 | 2/1988 | Endo et al. | 347/56 |
| 4,740,796 | 4/1988 | Endo et al. | 347/56 |
| 4,829,324 | 5/1989 | Drake et al. | 347/63 |
| 5,016,023 | 5/1991 | Chan et al. | 347/42 |
| 5,057,854 | 10/1991 | Pond et al. | 347/42 |
| 5,065,170 | 11/1991 | Rezanka et al. | 347/42 |
| 5,098,503 | 3/1992 | Drake | 156/299 |
| 5,189,521 | 2/1993 | Ohtsubo et al. | 358/296 |
| 5,343,231 | 8/1994 | Suzuki | 347/14 |
| 5,347,369 | 9/1994 | Harrington | 358/401 |
| 5,353,051 | 10/1994 | Katayama et al. | 347/13 |
| 5,477,244 | 12/1995 | Shibata et al. | 347/19 |
| 5,519,419 | 5/1996 | Stephany et al. | 347/19 |
| 5,553,162 | 9/1996 | Gaborski et al. | 382/192 |

FOREIGN PATENT DOCUMENTS

| | | |
|---|---|---|
| 0 468075 | 1/1992 | European Pat. Off. . |
| 0 605 216 | 7/1994 | European Pat. Off. . |
| 55-132253 | 10/1980 | Japan . |
| 59-123670 | 7/1984 | Japan . |
| 59-138461 | 8/1984 | Japan . |
| 2002009 | 1/1990 | Japan . |
| 4229278 | 8/1992 | Japan . |
| 4232749 | 8/1992 | Japan . |
| 5024192 | 2/1993 | Japan . |
| 7242004 | 9/1995 | Japan . |

*Primary Examiner*—John Barlow
*Assistant Examiner*—Craig A. Hallacher
*Attorney, Agent, or Firm*—Fitzpatrick, Cella, Harper & Scinto

[57] ABSTRACT

An apparatus and method for correcting printing characteristics of a full-line printhead, and producing a high-printing quality printhead at high manufacturing yield, a corrected printhead by this apparatus, and a printer employing this printhead are disclosed. According to this method, an image is printed on a printing medium by using double pulses obtained based on fluctuation of resistance of each printing unit of a printhead, and a reference OD value is determined from an OD value histogram of the printed image. A preheating pulse width is selected, based on OD values of n printed images obtained by changing the preheating pulse width n times and the reference OD value, such that an OD value on each printing element is equal or close to the reference OD value. For example, assuming that the reference value is 0.43, a preheating pulse width on printing element No. 3 is $0.875\mu$ sec.

24 Claims, 19 Drawing Sheets

| PRINTING UNIT No.<br>APPLIED CURRENT DURATION | 1 | 2 | ....... | M |
|---|---|---|---|---|
| ① DURATION CALCULATED BASED ON SURFACE RESISTIVITY OF PRINTING UNIT | 3.75μs | 3.625μs | ....... | 3.625μs |
| ② PREHEATING PULSE WIDTH FOR REFERENCE PATTERN {MEANS OF ①} × α (α = 0.27) | 0.875μs | | | |
| ③ WAVEFORM OF DRIVING PULSE APPLIED TO PRINTING UNIT (PULSE WAVEFORM IN CASE OF REFERENCE PATTERN PRINTING) | PREPULSE MAIN PULSE<br>0.875μs  2.875μs | PREPULSE MAIN PULSE<br>0.875μs  2.75μs | ....... | PREPULSE MAIN PULSE<br>0.875μs  2.75μs |

FIG. 7

| PRINTING UNIT No.<br>APPLIED CURRENT DURATION | 1 | 2 | ...... | M |
|---|---|---|---|---|
| ① DURATION CALCULATED BASED ON SURFACE RESISTIVITY OF PRINTING UNIT | 3.75μs | 3.625μs | ...... | 3.625μs |
| ② PREHEATING PULSE WIDTH FOR REFERENCE PATTERN {MEANS OF ①} × α (α = 0.27) | 0.875μs | | | |
| ③ WAVEFORM OF DRIVING PULSE APPLIED TO PRINTING UNIT (PULSE WAVEFORM IN CASE OF REFERENCE PATTERN PRINTING) | PREPULSE MAIN PULSE<br>0.875μs  2.875μs | PREPULSE MAIN PULSE<br>0.875μs  2.75μs | ...... | PREPULSE MAIN PULSE<br>0.875μs  2.75μs |

FIG. 8

| CORRECTION PARAMETER \ PRINTING ELEMENT No. | 1 | 2 | 3 | ... | M×N−1 | M×N |
|---|---|---|---|---|---|---|
| ① PREHEATING 0.875μs | 0.41 | 0.35 | *0.44 | ...... | 0.42 | 0.38 |
| ② PREHEATING 1.000μs | *0.44 | 0.37 | 0.47 | ...... | *0.43 | 0.40 |
| ③ PREHEATING 1.125μs | 0.46 | 0.39 | 0.49 | ...... | 0.45 | *0.42 |
| ④ PREHEATING 1.25μs | 0.48 | *0.43 | 0.51 | ......  | 0.47 | 0.45 |
| ...... | | | | | | |
| ⑩ PREHEATING 2.0μs | 0.62 | 0.51 | 0.67 | ...... | 0.60 | 0.60 |
| SET CORRECTION PARAMETER | ② | ④ | ① | | ② | ③ |

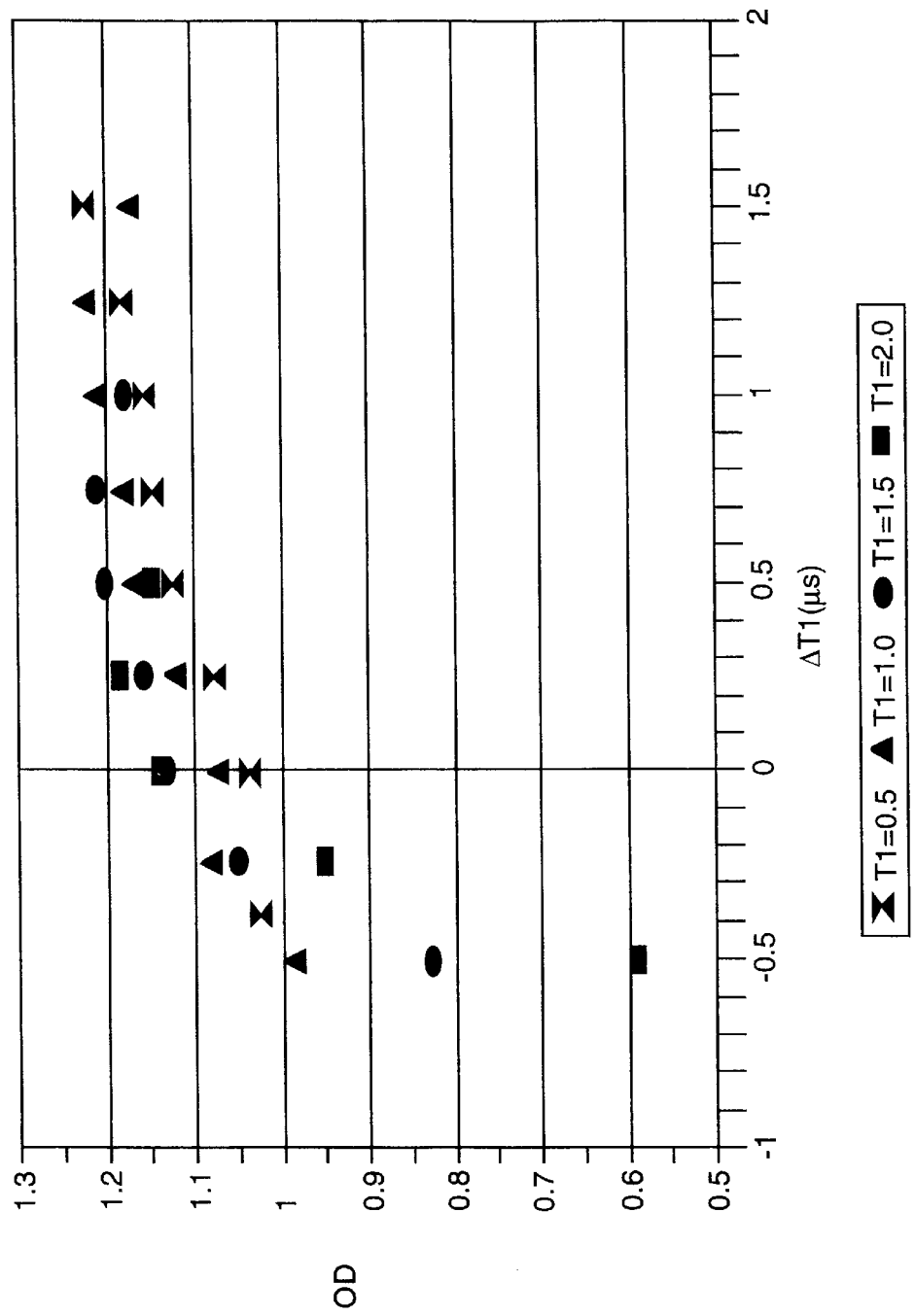

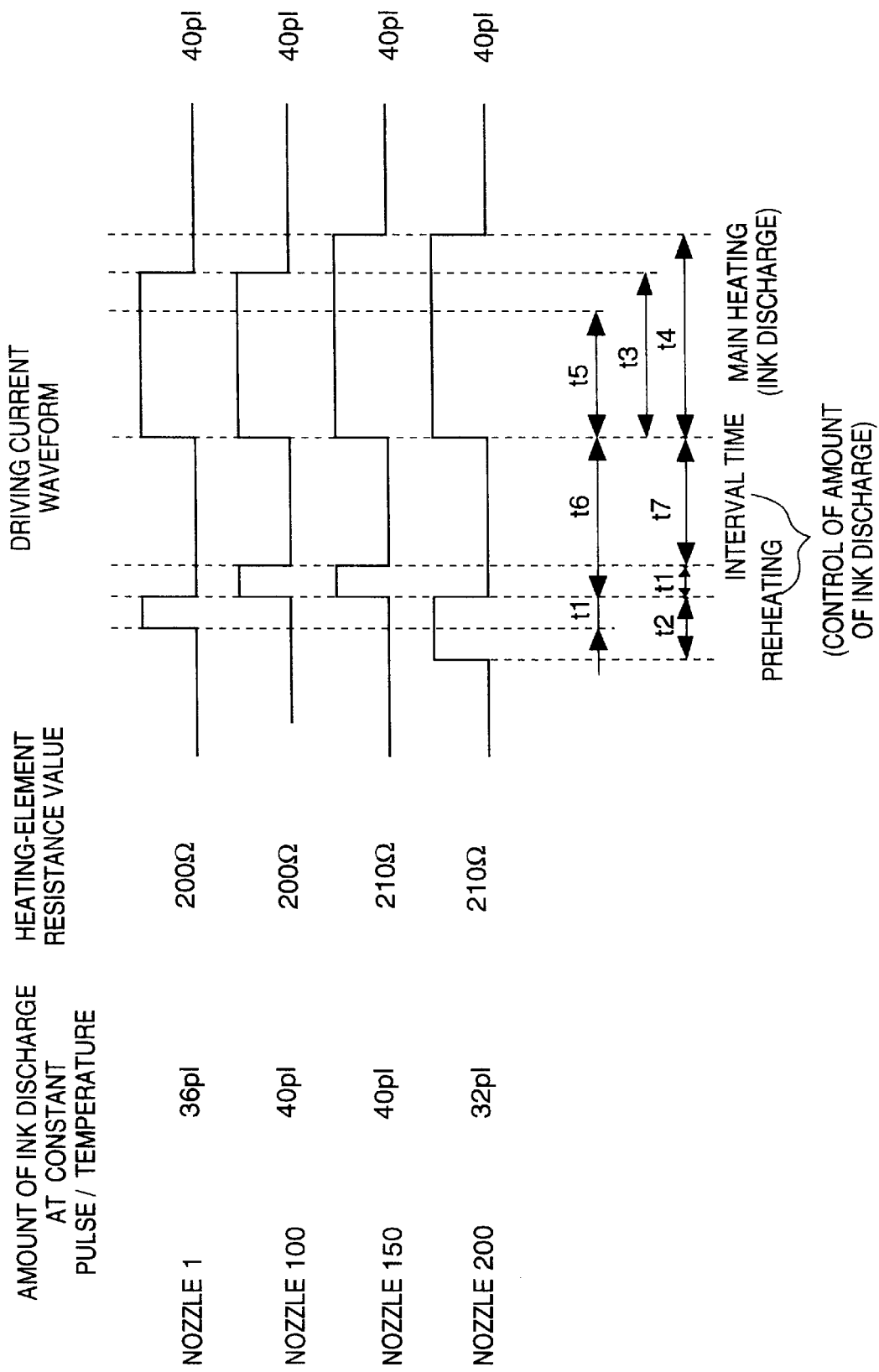

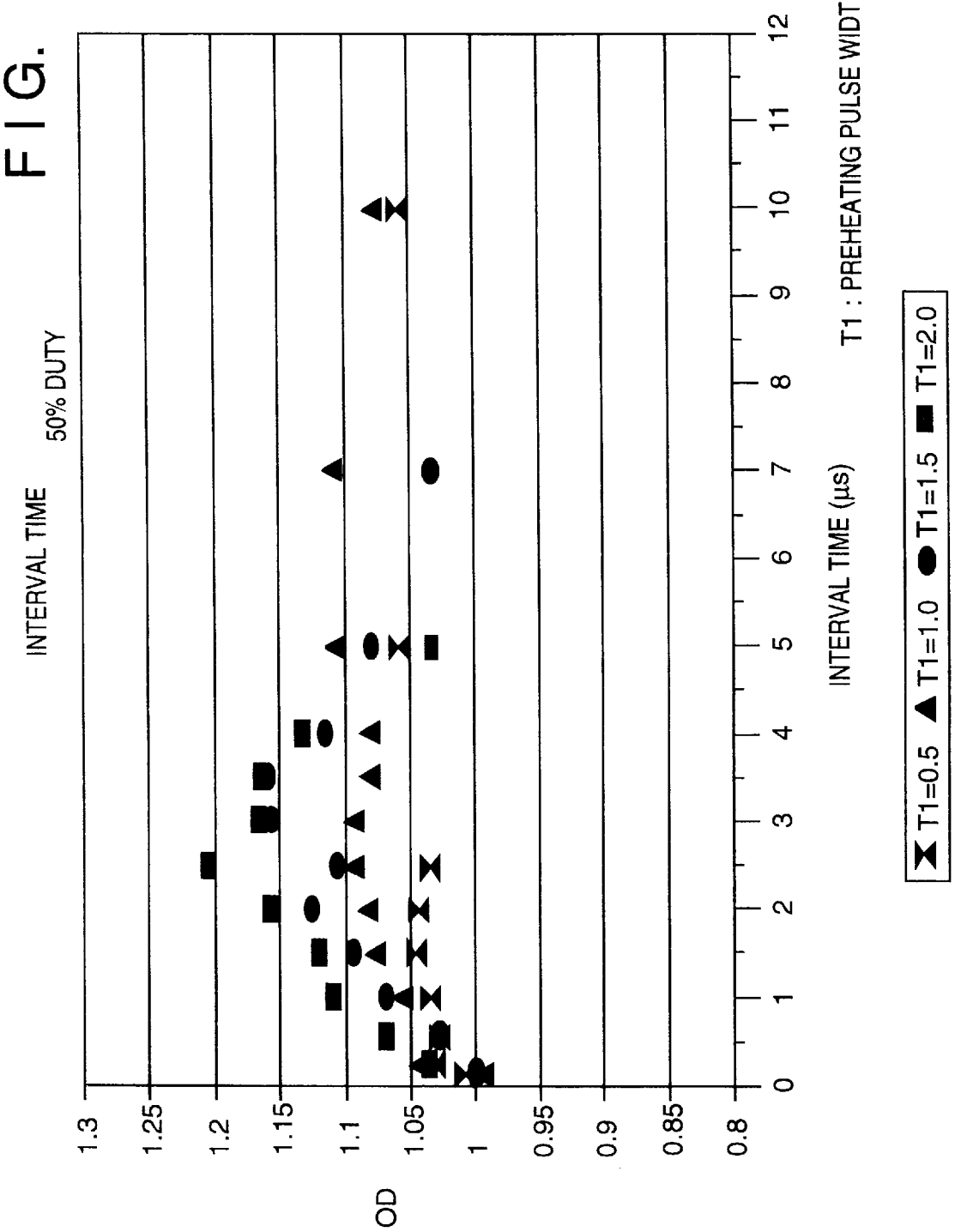

METHOD AND APPARATUS FOR CORRECTING PRINTHEAD, PRINTHEAD CORRECTED BY THIS APPARATUS, AND PRINTING APPARATUS USING THIS PRINTHEAD

BACKGROUND OF INVENTION

This invention relates to a method and apparatus for correcting a printhead, a printhead corrected by this apparatus, and a printing apparatus using this printhead. More particularly, the invention relates to a method and apparatus for correcting, by way of example, a full-line printhead equipped with a plurality of printing elements corresponding to the printing width of a recording medium, a printhead corrected by this apparatus, and a printing apparatus using this printhead.

A printer or the printing section of a copying machine or facsimile machine is so adapted as to print an image, which comprises a dot pattern, on a recording medium such as a paper, a thin plastic sheet or fabric based upon image information.

Among these printing apparatuses, those which are the focus of attention because of their low cost are mounted with printheads that rely upon the ink-jet method, the thermosensitive-transfer method or the LED method, etc., in which a plurality of printing elements corresponding to dots are arrayed on a base.

In a printhead in which these printing elements are arrayed to correspond to a certain printing width, the printing elements can be formed through a process similar to a semiconductor manufacturing process. Accordingly, a transition is now being made from a configuration in which the printhead and driving integrated circuitry are arranged separately of each other to an integrated assembled configuration in which the driving integrated circuitry is structurally integrated within the same base on which the printing elements are arrayed.

As a result, complicated circuitry involved in driving the printhead can be avoided and the printing apparatus can be reduced in size and cost.

Among these types of printing methods, the ink-jet printing method is particularly advantageous. Specifically, according to this method, thermal energy is made to act upon ink and the ink is discharged by utilizing the pressure produced by foaming. This method is advantageous in that the response to a printing signal is good and it is easy to group the orifices close together at a high density. There are greater expectations for this method in comparison with the other methods.

When the printhead is manufactured by applying a semiconductor manufacturing process and, in particular, when numerous printing elements that are to be made to correspond to the printing width are arrayed over the entire area of a base, it is very difficult to manufacture all of the printing elements without any defects. As a consequence, the manufacturing yield of the process for manufacturing the printhead is poor and this is accompanied by higher cost. There are occasions where such a printhead cannot be put into practical use because of the costs involved.

Accordingly, methods of obtaining a full-line printhead have been disclosed in the specifications of Japanese Patent Application Laid-Open (KOKAI) Nos. 55-132253, 2-2009, 4-229278, 4-232749 and 5-24192 and in the specification of U.S. Pat. No. 5,016,023. According to these methods, a number of high-yield printheads each having an array of printing elements of a comparatively small number of orifices, e.g., 32, 48, 64 or 128 printing elements, are placed upon (or upon/below) a single base at a high precision in conformity with the density of the array of printing elements, thereby providing a full-line printhead whose length corresponds to the necessary printing width.

It has recently become possible on the basis of this technique to simply manufacture a full-line printhead by arraying printing elements of a comparatively small number (e.g., 64 or 128) of orifices on bases (also referred to as "printing units") and bonding these printing units in a row on a base plate in highly precise fashion over a length corresponding to the necessary printing width.

Though it has thus become easy to manufacture a full-line printhead, certain performance-related problems remain with regard to a printhead manufactured by the foregoing manufacturing method. For example, a decline in printing quality, such as density unevenness, cannot be avoided. The cause is a variation in performance from one printing unit (base) to another in the row of such printing units, a variation in the performance of neighboring printing elements between the arrayed printing units and heat retained in each driving block at the time of printing.

In particular, in the case of an ink-jet printhead, not only a variation in the neighboring printing elements between the arrayed printing units but also a decline in ink fluidity owing to the gaps between printing units results in lower yield in the final stage of the printhead manufacturing process. For this reason, the state of the art is such that these printheads are not readily available on the market in large quantities regardless of the fact these printheads exhibit highly satisfactory capabilities.

As disclosed in Japanese Laid-Open Patent Application No. 7-242004 (U.S. patent application Ser. No. 08/397,352), there is a method of correcting the unevenness in the density of a printhead by measuring dot diameter and correcting unevenness based upon the results of measurement, as a means of correcting density unevenness in the printhead. However, it is still necessary to improve reproducibility of printed dots. For example, when one line of printing has been performed, the characteristics of the printed dots change subtly on the next line, over the next several dozen lines and over the next several hundred lines. (This is known as "fluctuation" from dot to dot.) Since a specific phenomenon (dot diameter) which incorporates this fluctuation is employed as information regarding density unevenness, satisfactory results are not obtained with a single correction. In order to acquire the desired image quality, it is required that printed dot data from several measurements be acquired to perform the correction. In a case where electrical energy is converted to thermal energy in conformity with correction data, energy which is larger than usual is applied to the printing elements that exhibit a low density. Thus, it is highly desirable to further improve reliability in terms of the durability of the printhead.

Furthermore, there is another conventional method such as a prediction method using an OD value, or predicting density unevenness from the fluctuation of dot diameter data acquired in printhead manufacturing process and employing it as correction data. However, a good correlation between printhead performance and the correction data does not always exist according to these methods. Thus, accurate density correction is not always ensured.

SUMMARY OF THE INVENTION

Accordingly, it is an object of the present invention to provide an apparatus for ensuredly performing density unevenness correction on printing characteristics of a printhead without heavy load on the printhead, and producing a printhead in low-cost and high manufacturing yield.

According to one aspect of the present invention, the foregoing object is attained by providing an apparatus for correcting printing characteristics of a printhead having a plurality of printing elements and memory means for storing data, comprising: first printing means for applying n signals to the printhead, and experimentally printing a first printing pattern on a recording medium n times using the printhead; selecting means for selecting one of n signals in units of a predetermined number of printing elements in such a manner that the printed image density is equal or close to a reference density, based on n printed first printing patterns; and transmitting means for transmitting the characteristics of the signal selected by the selecting means as correction data to the memory means of the printhead.

It is another object of the present invention to provide a method of ensuredly performing density unevenness correction on printing characteristics of a printhead without heavy load on the printhead, and producing a printhead in low-cost and high manufacturing yield.

According to another aspect of the present invention, the foregoing object is attained by providing a method of correcting printing characteristics of a printhead having a plurality of printing elements and a memory unit for storing data, comprising: a first printing step of applying n signals to the printhead, and experimentally printing a first printing pattern on a recording medium n times using the printhead; a selecting step of selecting one of n signals in units of a predetermined number of printing elements in such a manner that the printed image density is equal or close to a reference density, based on n printed first printing patterns; and a transmitting step of transmitting the characteristics of the signal selected in the selecting step as correction data to the memory unit of the printhead.

It is still another object of the present invention to provide a printhead capable of ensuredly correcting density unevenness without heavy load on the printhead at low-cost and high manufacturing yield.

According to still another aspect of the present invention, the foregoing object is attained by providing a printhead corrected by the above-mentioned apparatus.

It is still another object of the present invention to provide a printing apparatus using the above printhead.

According to still another aspect of the present invention, the foregoing object is attained by providing a printing apparatus using the above-mentioned printhead, comprising: receiving means for receiving the correction data from the printhead; generating means which, on the basis of the correction data, generates a control signal for controlling operation of drive means, included in the printhead, for driving a plurality of printing elements in such a manner that the plurality of printing elements form uniform pixels; and transmitting means for transmitting the control signal to the printhead.

In accordance with an apparatus provided by the present invention as described above, the apparatus applies n signals to a printhead including a plurality of printing elements and memory means capable of storing information, experimentally prints a first printing pattern n times, selects one of n signals in units of a predetermined number of printing elements, based on the density distribution of the printed first printing patterns such that the density of the printed image is equal or close to a reference density, and transmits the characteristics of the selected signal as correction data to the memory means of the printhead.

In accordance with a printing apparatus employing the printhead corrected by the above apparatus provided by the present invention as described above, the printing apparatus receives correction data stored in memory means of a printhead, generates a control signal to control an operation of driving means equipped with the printhead, based on the correction data so that each of a plurality of printing elements of the printhead can form uniform pixels, and transmits the control signal to the printhead.

The present invention is particularly advantageous since printing characteristics of a printhead can be easily corrected so that printing quality such as density unevenness can not be deteriorated. This results in producing a printhead at low-cost and high manufacturing yield.

Particularly, in a case where a printing is made on a recording medium such as a color filter and the printing result is read by some apparatuses, density unevenness on each of printing elements has to be taken into consideration. Thus, the present invention is very advantageous since density correction can be performed on each of the printing elements.

Additionally, a printing apparatus employing the corrected printhead as described above can perform high quality printing for each of pixels without density unevenness.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram showing double pulse widths on each printing unit to print a reference pattern;

FIG. 8 is a diagram showing an OD value on each printing element obtained from various printed test patterns in accordance with variation of a preheating pulse width;

FIG. 17 is a diagram showing the relationship between an OD value and preheating pulses;

FIG. 18 is a diagram showing driving current waveforms for driving the printing elements of this embodiment; and FIG. 19 is a diagram showing the relationship between an OD value and interval time.

DESCRIPTION OF THE PREFERRED EMBODIMENTS

Preferred embodiments of the present invention will now be described in detail in accordance with the accompanying drawings.

Figure 1:
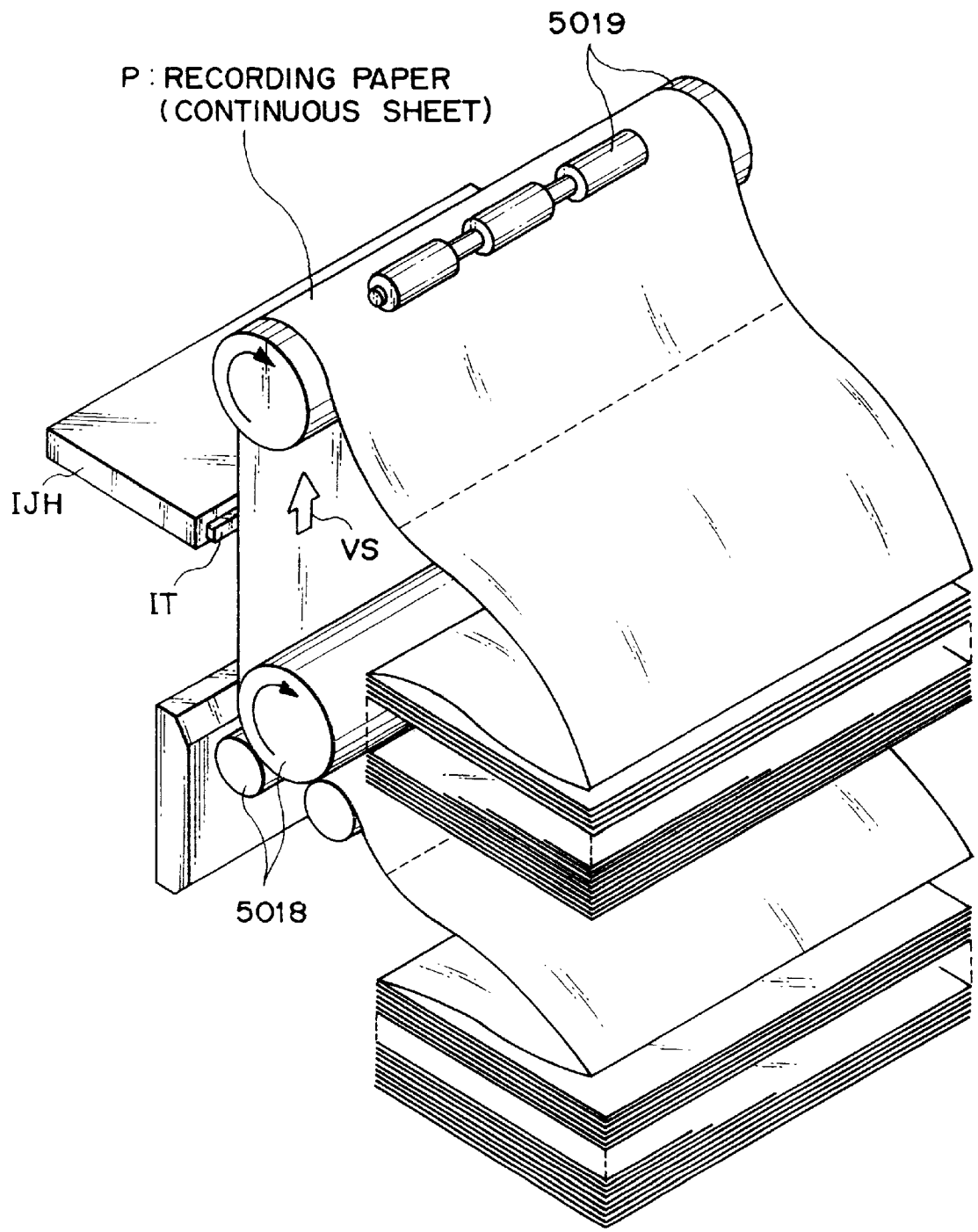
FIG. 1 is a general view of a full-line ink-jet printer, which is a typical embodiment of the present invention.

FIG. 1 is an external perspective view showing the principal portions of an ink-jet printer IJRA, which is a typical embodiment of the present invention. As shown in FIG. 1, the printer has a printhead (a full-length multiple printhead) IJH arranged along a range of full width of recording paper (a continuous sheet) P. The printhead IJH discharges ink over a range extending across the full width of the recording paper P. The ink is discharged toward the recording paper P from an orifice IT of the printhead at a prescribed timing.

In this embodiment, the continuous sheet of foldable recording paper P is conveyed in the direction VS in FIG. 1 by driving a conveying motor under the control of a control circuit, described below. An image is printed on the recording paper. The printer in FIG. 1 further includes sheet feeding rollers 5018 and discharge rollers 5019. The discharge rollers 5019 cooperate with the sheet feeding rollers 5018 to hold the continuous sheet of recording paper P at the printing position and operate in association with the sheet feeding rollers 5018, which are driven by a drive motor (not shown), to feed the recording paper P in the direction of arrow VS.

Figure 2:
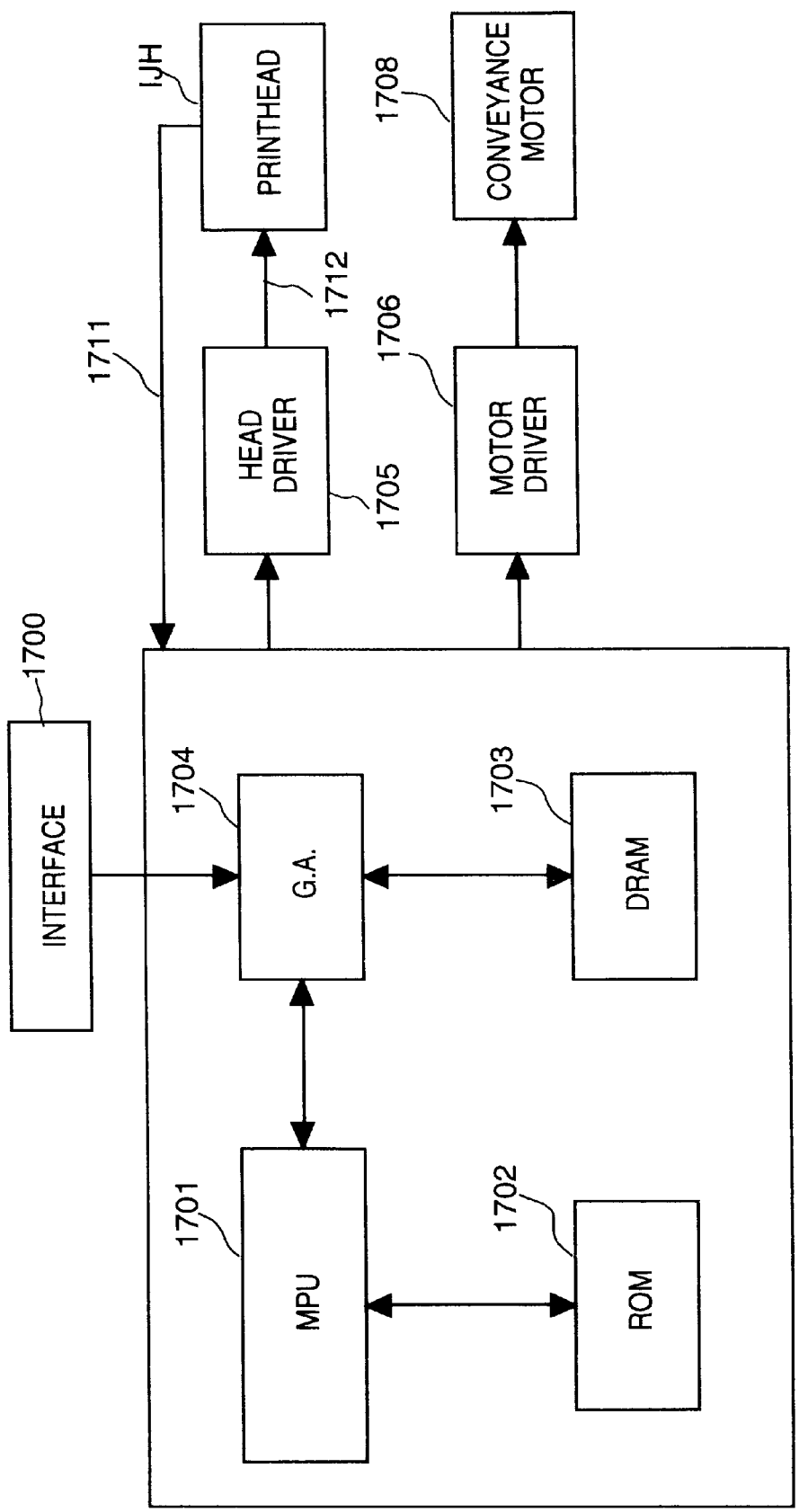
FIG. 2 is a block diagram showing a control configuration for executing control of printing in the ink-jet printer.

FIG. 2 is a block diagram illustrating the construction of the control circuit of the ink-jet printer. Shown in FIG. 2 are an interface 1700 for entering a printing signal from an external device such as a host computer, an MPU 1701, a ROM 1702 for storing a control program (inclusive of character fonts as necessary) executed by the MPU 1701, a DRAM 1703 for temporarily saving various data (the above-mentioned printing signal and printing data that is supplied to the printhead), and a gate array (G.A.) 1704 for controlling supply of printing data to the printhead IJH. The gate array 1704 also controls transfer of data among the interface 1700, MPU 1701 and RAM 1703. Also shown are a conveyance motor 1708 for conveying recording paper (the continuous sheet in this embodiment), a head driver 1705 for driving the printhead; and a motor driver 1706 for driving the conveyance motor 1708.

As for the general operation of the above-mentioned control circuit, the printing signal enters the interface 1700, whereupon the printing signal is converted to printing data for printing between the gate array 1704 and MPU 1701. The motor driver 1706 is driven into operation and the printhead IJH is driven in accordance with the printing data sent to the head driver 1705. As a result, a printing operation is carried out.

Figure 14:
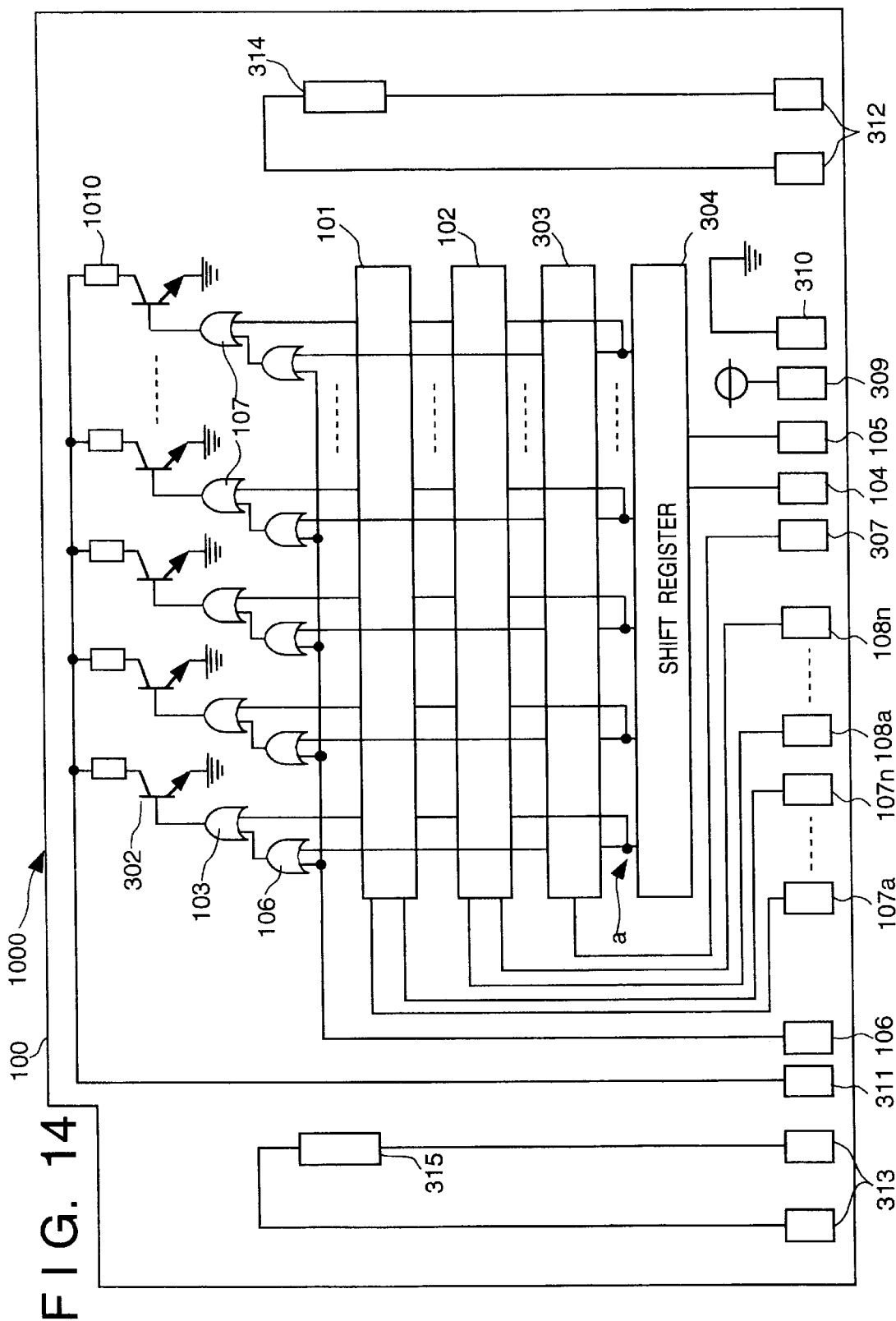
FIG. 14 is a diagram showing an example of the circuit arrangement of a drive circuit provided on the heater board for the printhead.

Numeral 1711 denotes a signal line for monitoring sensors (e.g., a heating-resistor sensor 314 and a temperature sensor 315, which are shown in FIG. 14) of each board, and for transmitting correction data from a memory 13 (described later) storing correction data which corrects for a variation in each board (heater board 1000, described later) provided within the printhead IJH. Numeral 1712 denotes a signal line for carrying preheating pulses, latch signals and heating pulses. On the basis of the correction data from the memory 13 in the printhead IJH, the MPU 1701 sends the printhead IJH a control signal via the signal line 1712 in such a manner that the boards are capable of forming uniform pixels.

Figure 3:
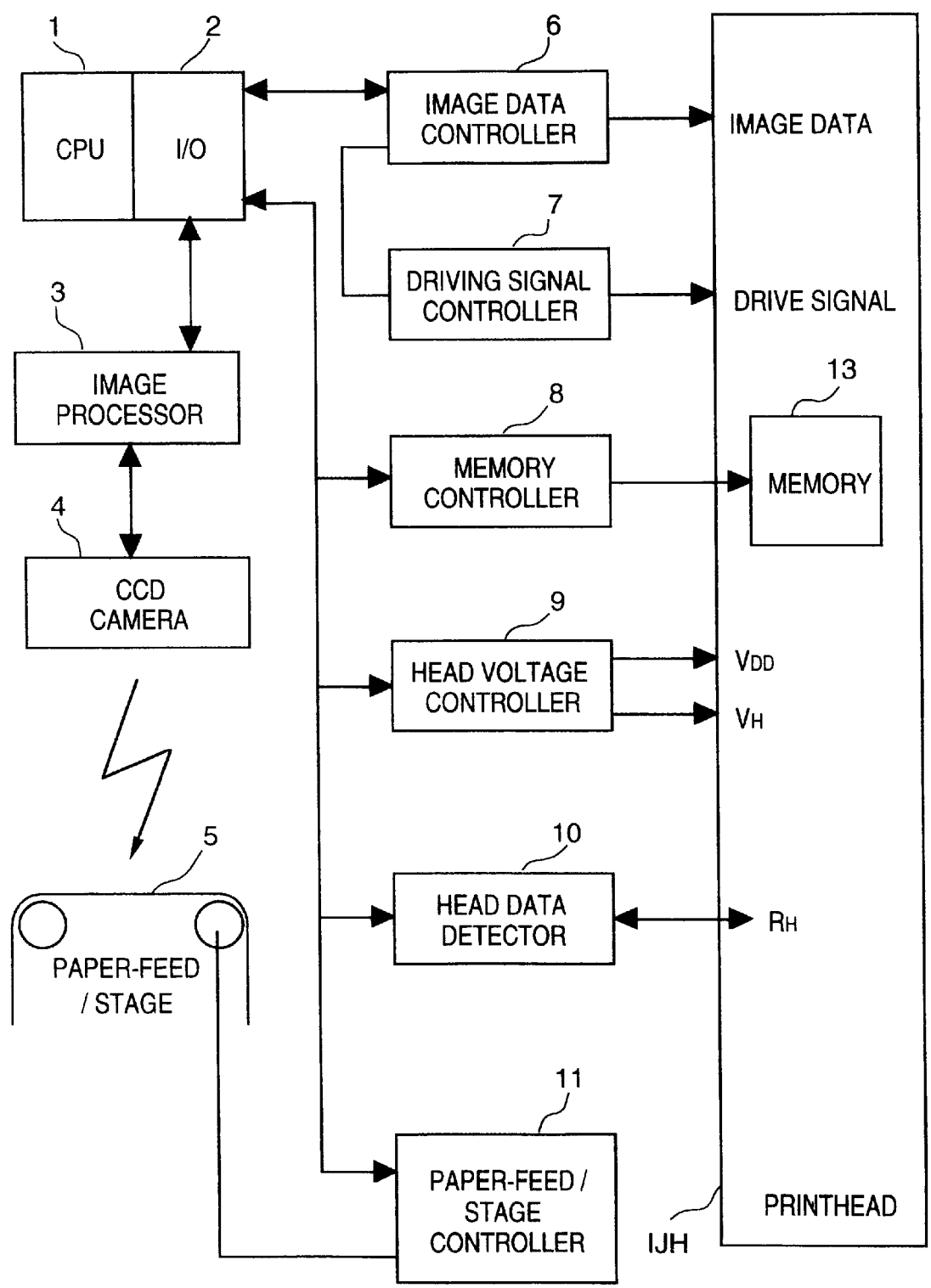
FIG. 3 is a block diagram showing the construction of a printhead correction apparatus according to this embodiment.

FIG. 3 is a block diagram illustrating the construction of the printhead correction apparatus of this embodiment. An I/O interface 2 interfaces the CPU 1 with the various controllers of the apparatus. An image processor 3 uses a CCD camera 4 to read the printing dot pattern on a recording medium placed upon a paper feeding stage 5 and converts the dot diameter and density unevenness of the dot pattern to pixel values. When the dot data corresponding to all printing elements of the printhead IJH is sent from the image processor 3 to the CPU 1, the latter operates upon the dot data, sends density correction data to a driving signal controller 7 in conformity with a drive signal for driving the printhead IJH and causes a memory controller 8 to develop the density correction data.

An image data controller 6 outputs a dot pattern to be recorded to the printhead IJH. The controller 6 transmits a density correction drive signal while sending a synchronizing signal to the drive signal controller 7 not only at the time of ordinary printing but also when the density correction data has been determined. The CPU 1 manages a head voltage controller 9 which controls the driving voltage of the printhead IJH and manages a stage/paper-feed controller 11 for controlling the operation of the paper feeding stage 5, thereby setting a proper drive voltage and controlling stage movement and paper feed. Furthermore, a head data detector 10 is an important component which feeds back, for the purpose of density correction, the characteristics of each board (printing unit) 1000 (see FIG. 10) within the printhead IJH.

In the printhead IJH which, by way of example, is composed of a row of a plurality boards 1000 on which 64 or 128 printing elements have been disposed, it is not known from which portions of a silicon wafer or the like the boards 1000 have been cut. Accordingly, there are cases in which the characteristics differ from one board to another.

In such case, a rank detecting resistor element RH having a surface resistivity ($\Omega/\square$) identical with that of the printing element is provided in each board 1000 in order that all printheads can perform printing at a uniform density. There are also cases in which a semiconductor element capable of monitoring a change in temperature is provided for each board 1000. The head data detector 10 monitors these elements. When the head data detector 10 sends data obtained by monitoring these elements to the CPU 1, the latter generates correction data, which is for correcting the data that drives each of the boards 1000, in such a manner that each board 1000 in the printhead can print at a uniform density. The rank mentioned here is a parameter obtained by quantifying the characteristics of each board 1000. The parameter is expressed by a function of a surface resistivity ($\Omega/\square$).

When the above-mentioned correction data is reflected in each controller of the printhead correction apparatus, the printing operation by the printhead IJH is executed under these conditions. In the correcting apparatus, the results of printing are again subjected to image processing by the CCD camera 4 and image processor 3, and the memory controller 8 writes the final correction data in the memory 13 (a non-volatile memory such as an EEPROM) at a stage at which the predetermined criteria of the printhead is satisfied.

Figure 4:
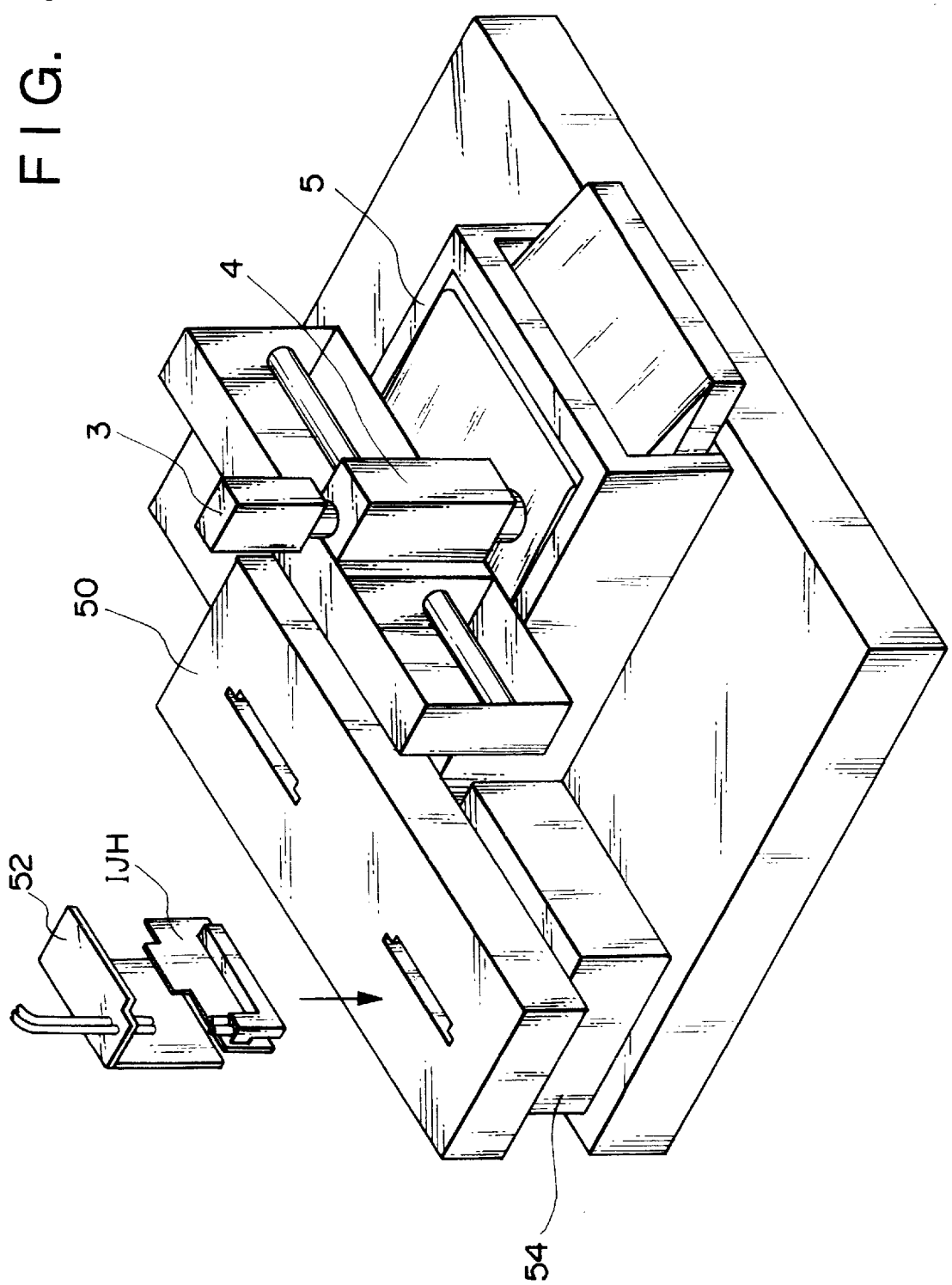
FIG. 4 is a perspective view showing the construction of the printhead correction apparatus.
Figure 5:
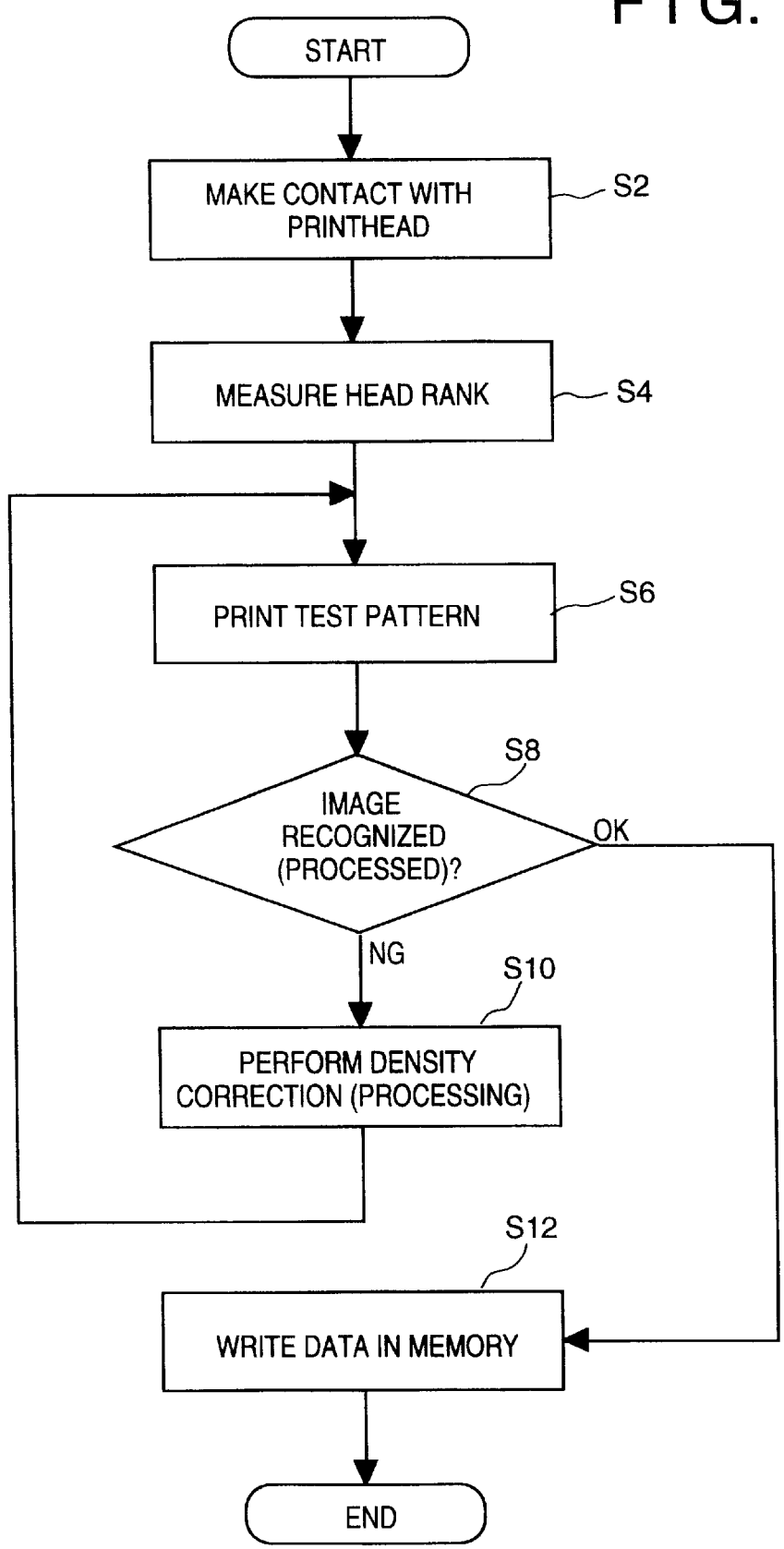
FIG. 5 is a flowchart showing the operation of the printhead correction apparatus.

FIG. 4 is an external perspective view showing the construction the printhead correction apparatus, and FIG. 5 is a flowchart illustrating the operation of the apparatus. Operation will now be described with reference to FIGS. 4 and 5. In this embodiment, the following two correction processings will be described: (1) a case where correction is made in units of four dots by generating density unevenness data every four dots; and (2) a case where correction is made in unit of one dot by generating density unevenness data every dot.

(1) Correction processing in units of four dots

When the printhead IJH is inserted into a slot of a securing table 50, the CPU 1 operates the table 50 and fixes the printhead IJH to the table 50 in such a manner that the printhead IJH can perform printing at a normal position. At the same time, electrical contact is made with the printhead IJH, and an ink supply device 52 is connected to the printhead IJH (step S2). Next, in order to measure the rank of the printhead IJH, the surface resistivity ($\Omega/\square$) of the substrate 1000 is monitored (step S4).

In the case of a full-line printhead unit, the surface resistivity ($\Omega/\square$) of each block (of each board in a case where the block is constituted by an array of a plurality of boards) is monitored, driving power is decided separately for each board and a test pattern is printed (step S6). As preprocessing for printing the test pattern, preliminary discharge (aging) is carried out until the operation of the printhead IJH stabilizes to enable stable printing by the printhead. Aging is performed on an aging tray juxtaposed on a head recovery processor 54, and recovery processing (ink suction, cleaning of orifice surfaces, etc.) is executed in such a manner that the test pattern can be printed normally. When a test pattern is thus printed, the result of printing is moved to the position of the CCD camera 4 and of the image processor 3, where the result of printing is subjected to image processing by these components and compared with parameters for printing evaluation. Processing is executed while taking the items mentioned below into account in relation to density unevenness of printing elements. Density unevenness is a parameter that can be improved.

Density unevenness of an image is produced by a difference in relative density contrast in printing performed by printing elements. The smaller the contrast, the less noticeable density unevenness is to the eye. When printing elements which produce a high-density printing are concentrated somewhat closely together in space, the occurrence of density unevenness becomes apparent.

When the limit on visual discriminating ability is put into the form of a formula from the viewpoint of density unevenness, the following relation is obtained from experiment:

$$\Delta OD = 0.02 \times \Delta Vd$$

(where Vd is the amount of ink discharge.) This equation shows that a disparity in amount of discharge of 1–4 pl (picoliters) results in a change of 0.02–0.08 in terms of the OD value. In an actual image, density unevenness results from a collection of printing dots causing variation. If a difference in amount of ink discharge on the order of 4 pl occurs between mutually adjacent printing elements, a fairly large difference in contrast is produced between these printing elements. However, in case of a printing density on the order of 300–600 dpi, it is impossible for the human eye to compare density unevenness between mutually adjacent dots in dot units.

When the discriminating limit of the human eye with respect to density unevenness in an image is taken into account, density unevenness data near the discriminating ability of the human eye can be created by (1) performing a density unevenness correction in units of several dots (two to eight pixels, depending upon printing density); and (2) increasing the number of events of image processing (the number of events per printed dot or the number of events in a group of printed dots) (16–1024 dots).

A procedure for creating such density unevenness data will now be described in detail.

Figure 6:
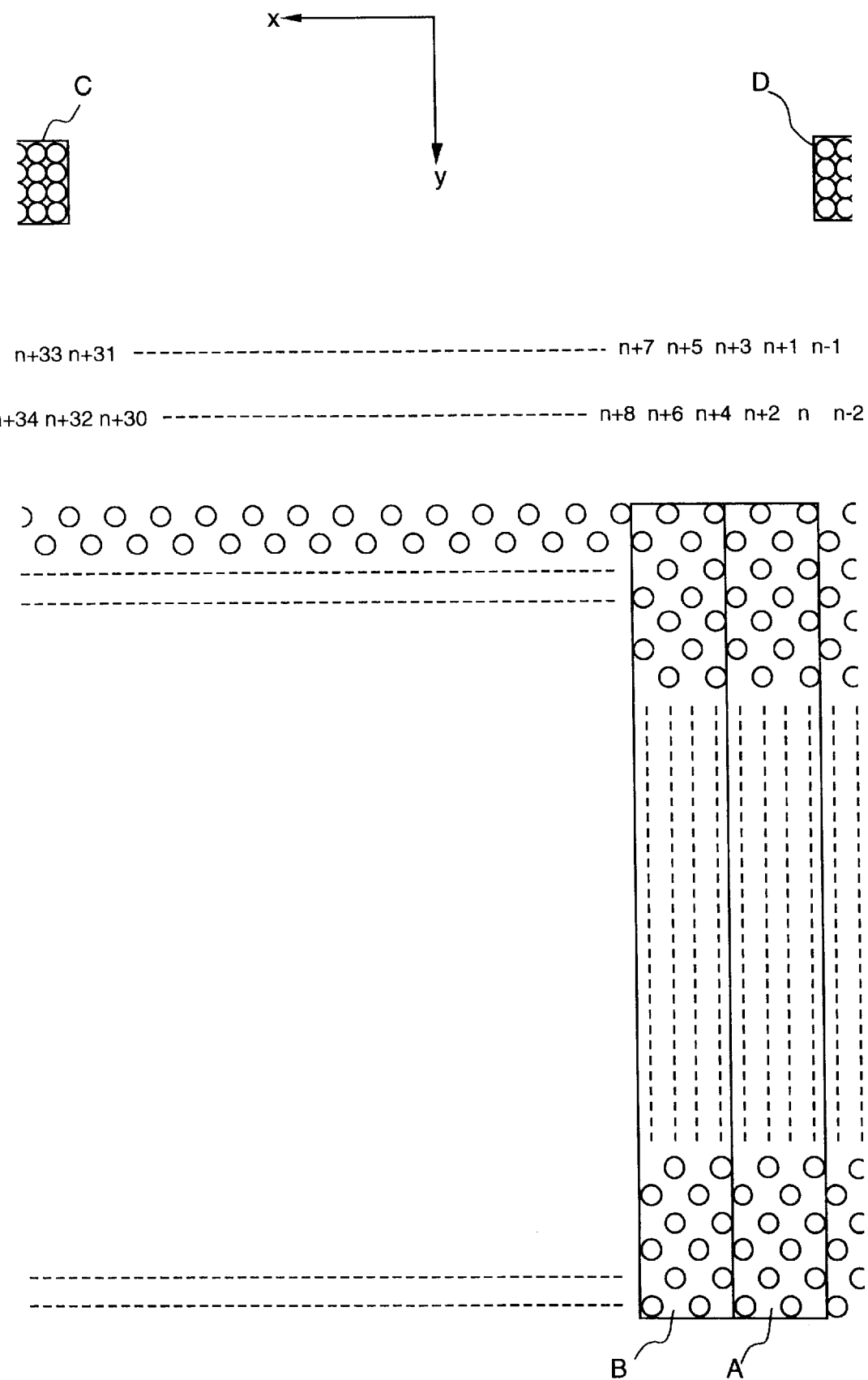
FIG. 6 is a diagram illustrating a test pattern used in this embodiment for correcting density.

FIG. 6 illustrates an example of an image pattern read by a CCD camera or the like. In FIG. 6, a dot pattern having a 50% duty is formed and a dot pattern of 32 dots×32 dots is allocated to the screen area of the CCD camera. In FIG. 6, A and B are areas of 4×32 dots each. In this embodiment, each one is one event. Further, C and D in FIG. 6 are disposed as markers for image recognition of the dot pattern of 32×32 dots.

Let n represent the first dot read. The area A constituting one event is composed of a collection of 32 bits in the y direction (the direction in which the recording medium is conveyed) from n to n+3 in the x direction (the column direction of the printing elements). Eight similar areas are produced in an image memory (not shown), and binarizing processing is performed in each area in accordance with the number of "black" or "white" pixels in the area and a predetermined threshold value. It should be noted that an optimum value obtained experimentally is used as the threshold value. As the result of this binarizing processing, density unevenness data is obtained for every four dots in the x direction.

Further, adopting the absolute density (the total number of black pixels) in each area as the density unevenness data also is effective.

Furthermore, an image having an area corresponding to more than 100 dots per one nozzle of a printing element can be read in and processed by an image scanner, wherein the dot pattern has the 50% duty shown in FIG. 6, and the processed results can be used as the density unevenness data.

Since an event number of more than 100 dots (100 printing operations) per nozzle is obtained with this method, a subtle fluctuation in dot diameter in relation to the y direction is averaged. When density unevenness is discriminated by the human eye, the fluctuation in the y direction is not very noticeable. However, when the number of events is small, the density unevenness does not become density unevenness that can be visually recognized by the human eye and is not appropriate as density unevenness data. The reason is that the data does not become statistical data that is meaningful to the extent that it can be visually discerned by the human eye. If density unevenness data in dot units is obtained in the x direction, several dots of the data can be collected and adopted as density unevenness data. In this case an arrangement may be adopted in which it is possible to externally set the number of dot units. In order to create correction data in units of four dots, as mentioned above, the density unevenness data in units of four dots in the x direction may be averaged.

The density unevenness data thus obtained does not have a complicated structure and can be processed in a short period of time in both a printhead manufacturing apparatus and a printer.

With regard to the density unevenness data every four dots obtained as described above, the same data is provided for every four nozzles of the printing.

When density unevenness data is thus obtained, how each element is to be corrected is decided based upon this data. For example, in a case where the driving power of each printing element of the printhead is decided by pulse width, driving pulse-width data applied to an integrated circuit for driving the printhead is selected. As will be described later, in a case where the pulse-width control circuit of the driving integrated circuit makes a selection from several pulse widths, the MAX, MIN of the pulse width selected are decided and a pulse width between these values is set based upon the resolution allowed. The pulse width is set so as to correct the printing density of each element in conformity with the image processing data, and the pulse width is made to correspond to each printing element, whereby it is possible to average the printing densities of the printhead unit. The foregoing is repeated until the above-described processing is finished. When this occurs, the resulting data is stored in the memory 13. This processing is carried out at steps S8–S12 in FIG. 5.

Note that this embodiment can reduce the number of testings performed until it is determined at step S8 that the testing is OK, compared to the above-mentioned Japanese Patent Application No. 6-34558 (U.S. patent application Ser. No. 08/397,352 filed on Mar. 2, 1995).

(2) Correction processing in unit of one dot

The above described density unevenness data is generated in units of four dots along with the arrayed direction of printing elements in such a manner that the data indicates significant density unevenness in view of human eye's discriminating ability. However, not in a case where an image printed on a paper is visually confirmed by human eyes, but in a case where the image printed on another type of recording medium such as a color filter is read or recognized by an apparatus, density unevenness for each dot greatly influences the image quality.

In such a case, it is necessary to correct image density unevenness for each dot. The following description is directed to a processing for correcting image density unevenness for each dot, using a preheating pulse width in double pulse width control for a printhead as a correction parameter, assuming that the printhead is a type in which one of n pre-heat pulse widths can be selected for each of printing elements arrayed along a line.

Note that the processing corresponds to step S4–S10 of the flowchart shown in FIG. 5.

First, at step S4, the surface resistivity ($\Omega/\square$) of each unit (substrate 1000) of the printhead is monitored as described above, applied current duration (sum of preheating pulse width and main heat pulse width) corresponding to each surface resistivity is calculated based on fluctuation of the monitored surface resistivity for each of M arrayed printing units. This calculation is basically obtained from result of simulation on printing elements. Since the printhead is constituted by M arrayed printing units, an averaged current duration is obtained for M printing units. The value of multiplying the obtained average by $\alpha$ ($0 \leq \alpha < 1$) is a preheating pulse width used for obtaining a reference OD value to be described below. Note that this pre-heat pulse width is commonly used for each printing unit.

FIG. 7 is a diagram showing an applied current duration for each printing unit, a preheating pulse width common to each printing unit, and double pulses to be applied to each printing unit. These listed applied current durations take the characteristics of the printhead into consideration. Note that the value of $\alpha$ is empirically obtained from double pulse control on a printhead.

Next, at step S6, the printhead correction apparatus prints (a) a reference pattern using the double pulses shown in FIG. 7, and (b) a test pattern for density correction on a recording medium, using a printhead to be corrected. These patterns are printed in units of approximately 100 dots along with the conveyance direction of the recording medium (y direction) so as to average very subtle fluctuation of each nozzle of the printhead, performing double pulse widths control on the printhead. These printings are repeated n times, changing a preheating pulse width.

Note that the above reference and test pattern are printed after the printing operation of the printhead to be corrected is stabilized.

At step S8, the CCD camera 4 reads the printed reference and test patterns, image-processes them, and converts them into OD values.

FIG. 8 is a table showing OD values, which are obtained from the image processing on the above printed and read test patterns, for each printing element and applied preheating pulse width. Particularly, FIG. 8 shows OD values for each printing element in a case where a preheating pulse width varies from $0.875\mu$ sec to $2.0\mu$ sec by $0.125\mu$ sec and the printing operation is performed 10 times (n=10). It is understood from FIG. 8 that though the preheating pulse width is constant, the OD value fluctuates over each printing element.

In this embodiment, an optimum value is selected from n preheating pulse widths for each printing element as a correction parameter so as to eliminate density unevenness. The optimum value is selected in such a manner that an OD value is equal or close to a reference OD value (described below). For example, if the reference OD value is 0.43, the preheating pulse width as a correction parameter for each printing element is selected in such a manner that a value indicated as ★ in FIG. 8 is selected. If density unevenness is performed using the correction parameter thus selected, the OD value for each printing element becomes nearly constant. As a result of this, density unevenness is eliminated. The number shown in the lowest column of FIG. 8 is a value identifying a selected correction parameter for each printing element.

Figure 9:
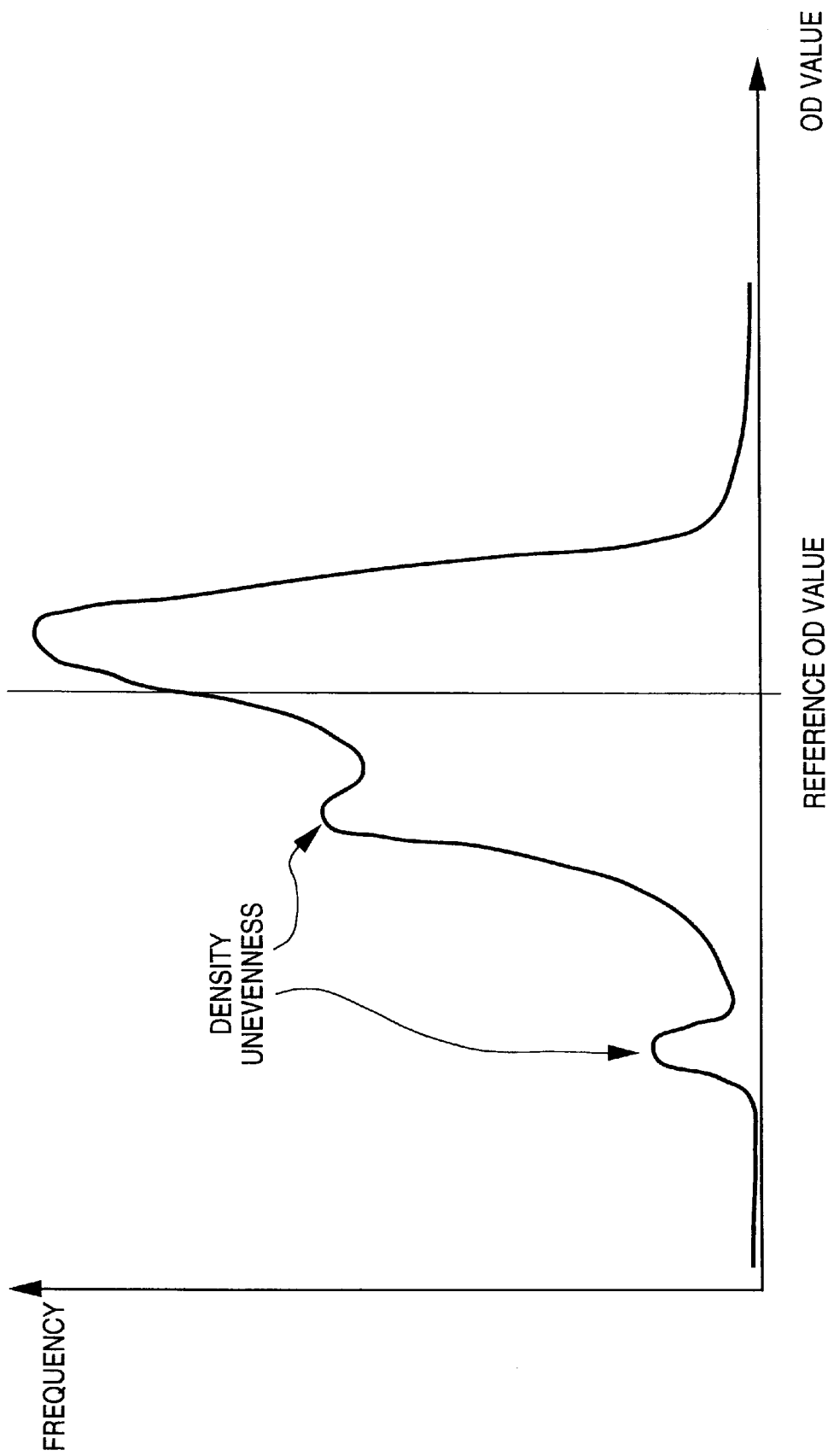
FIG. 9 is a histogram on OD values obtained from printing results of a reference pattern.

Now, we obtain the histogram over the OD values, based on the OD values obtained from the printed reference patterns. FIG. 9 is an example of a histogram on OD values from the reference pattern. Then, we can obtain a reference OD value, based on the statistically processed histogram. The reference OD value may be the maximum, minimum, median, mean, mode, dispersion from the mode value, or the like in the histogram. In other words, it can be said that the reference OD value is obtained according to the histogram on OD values from the printed reference pattern reflecting the characteristics of the printhead. Note that a correction term ($+\beta$) reflecting fluctuation of quality of a printhead to another in a production lot may be added to the obtained reference OD value such as the mean value. Regardless of whether the above correction term is added or not, the reference OD value obtained from the statistical processing on the printed reference patterns always reflects the characteristics (fluctuation of surface resistivity for each printing unit) of the printhead to be corrected.

As described above, FIG. 8 merely refers to the case where the number of printing operation is 10 (=n). It goes without saying that the greater the value of n becomes, the more complicated the construction of a correction circuit in a printhead becomes. Thus, in order to reduce density unevenness and produce a high-quality printhead in low-cost, it is important to keep n minimum as much as possible. Generally speaking, density unevenness is visually identified in a case where the difference of OD values between neighboring dots is great. It is empirically or experimentally confirmed that the difference is often a difference between a Gaussian distribution which approximates a histogram on OD values, obtained from printing results of the reference pattern, for each dot, and an OD value greatly deviated from the Gaussian distribution.

Thus, in the histogram on OD values from the reference pattern as shown in FIG. 9, even though the value of n is small, e.g. n=4, if a correction parameter causing a greatly deviated OD value to be adjusted to the reference OD value is provided, density unevenness correction can be sufficiently attained. It goes without saying that, even though the value of n is small, further density unevenness correction can be achieved under the condition that there is very few greatly-deviated OD values in the histogram on OD values from the reference pattern, that is, a printhead whose characteristics shows less density unevenness is used.

The above described correction according to this embodiment, compared to a method of predictively correcting density unevenness based on fluctuation data obtained from printhead manufacturing and inspecting process, can more accurately perform correction since the correction is based on actual printing by a printhead.

Figure 10:
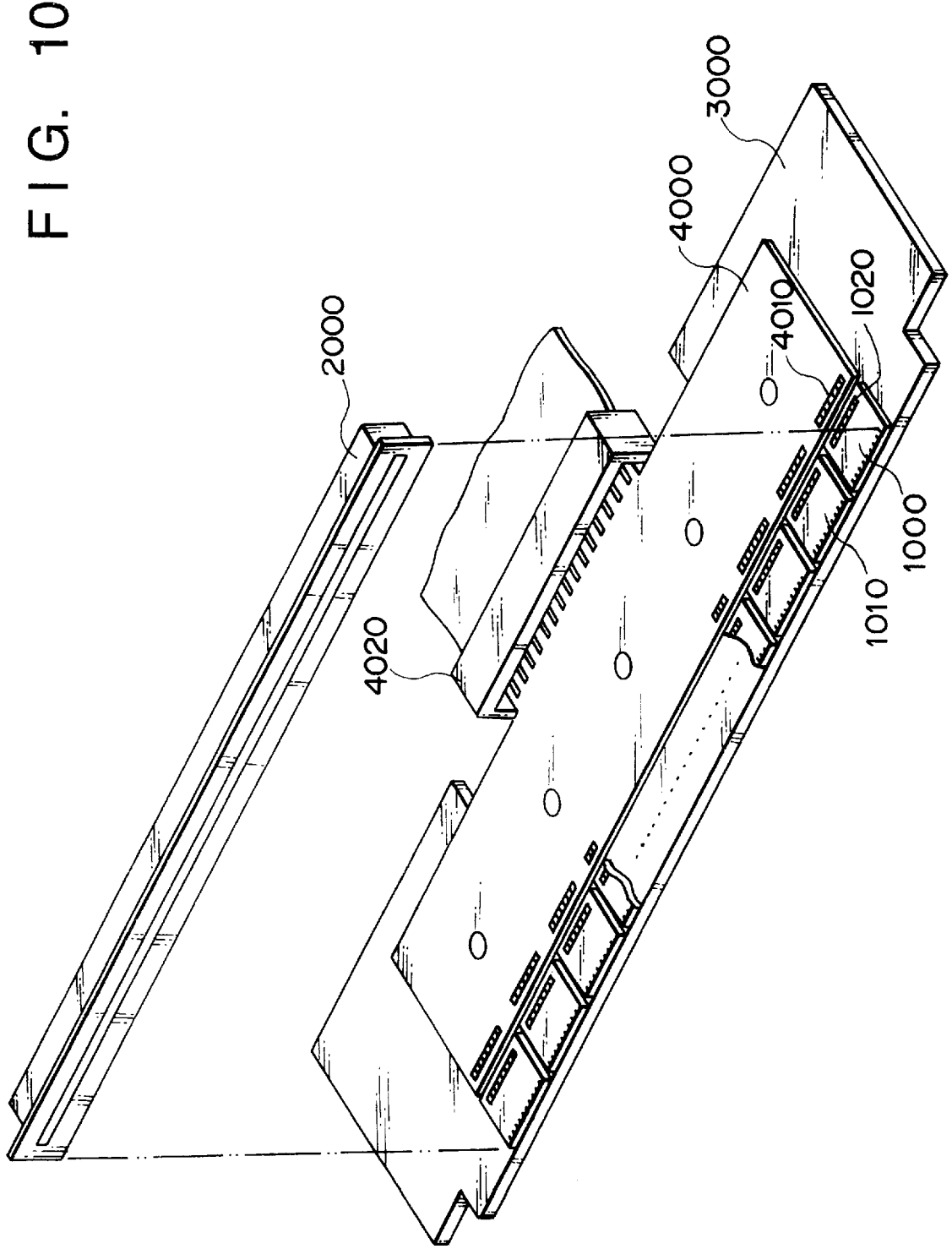
FIG. 10 is an exploded perspective view for describing the construction of a printhead according to the present invention.

FIG. 10 is an exploded perspective view for describing the construction of the printhead of this embodiment. In this example, a case is described in which the printing elements are elements for generating ink-discharge energy used to jet ink. (In a bubble-jet printing method, each element comprises a pair of electrodes and a heating resistor element provided between these electrodes).

In accordance with the method described below, the full-line printhead, which is faultlessly fabricated over its entire width by a conventional photolithographic process or the like, is obtained at a very high yield. Moreover, a single, unitary grooved member having a plurality of ink discharge orifices formed in one end and a plurality of grooves connected to these orifices and formed in the grooved member from one end to the other is joined to this printhead in such a manner that the grooves are closed by the boards, whereby a full-line, ink-jet printhead unit can be corrected in a very simple manner.

The ink-jet printhead described in this embodiment has ink discharge orifices at a density of 360 dpi (70.5 μm), the number of nozzles thereof being 3008 (for a printing width of 212 mm).

In FIG. 10, the board (hereinafter referred to as a heater board) 1000 has 128 discharge-energy generating devices 1010 arranged at prescribed positions at a density of 360 dpi. Each heater board 1000 is provided with a signal pad to drive the discharge-energy generating devices 1010 at any timing by externally applied electric signals, and with a power pad 1020 for supplying an electric power for the driving.

The row of the heater boards 1000 is fixedly bonded by a bonding agent to the surface of a base plate 3000 made of a material such as metal or ceramic.

Figure 11:
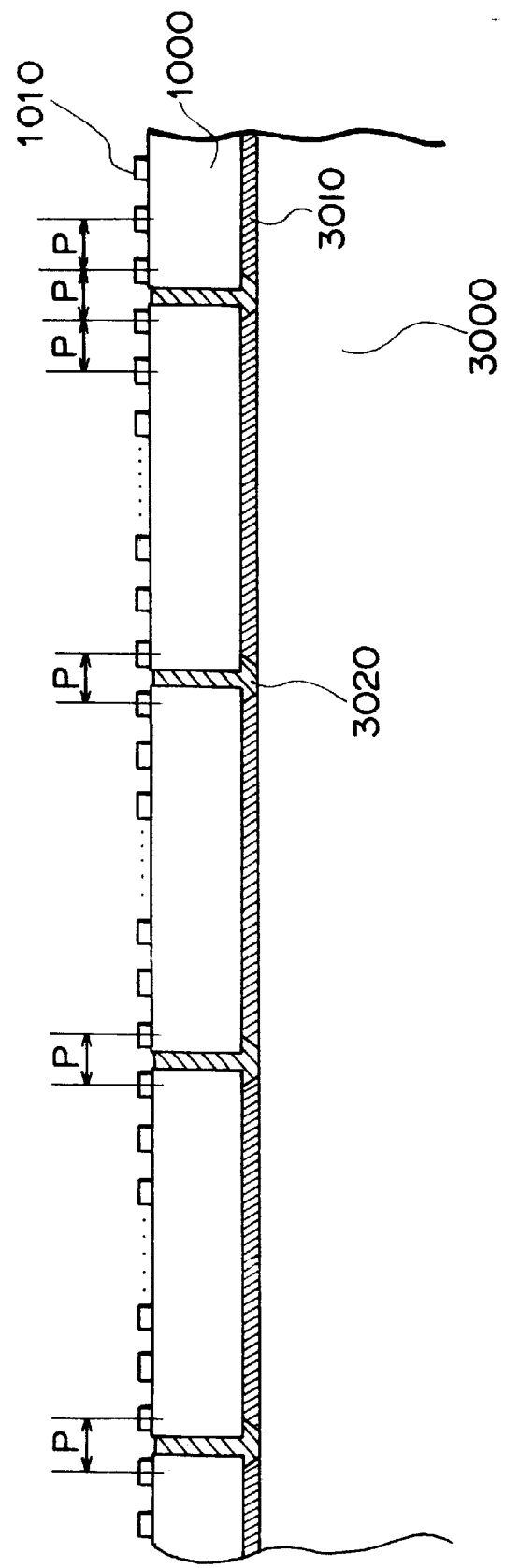
FIG. 11 is a detailed view showing heater boards arranged side by side.

FIG. 11 is a detailed view showing the heater boards 1000 in the arrayed state. The heater boards are fixedly bonded to a prescribed location on the base plate 3000 by a bonding agent 3010 applied to a prescribed thickness. At this time each heater board 1000 is fixedly bonded in precise fashion in such a manner that the spacing or pitch between the discharge-energy generating devices 1010 situated at the respective edges of two mutually adjacent heater boards will be equal to the spacing or pitch P (=70.5 μm) of the discharge-energy generating devices 1010 on each heater board 1000. Further, the gaps produced between adjacent heater boards 1000 are filled and sealed by a sealant 3020.

With reference again to FIG. 10, a wiring board 4000 is fixedly bonded to the base plate 3000 in the same manner as the heater boards. At this time the wiring board 4000 is bonded to the base plate 3000 in a state in which the pads 1020 on the heater boards 1000 are in close proximity to signal-power supply pads 4010 provided on the wiring board 4000. A connector 4020 for receiving a printing signal and driving power from the outside is provided on the wiring board 4000.

A grooved member 2000 will now be described.

Figure 12:
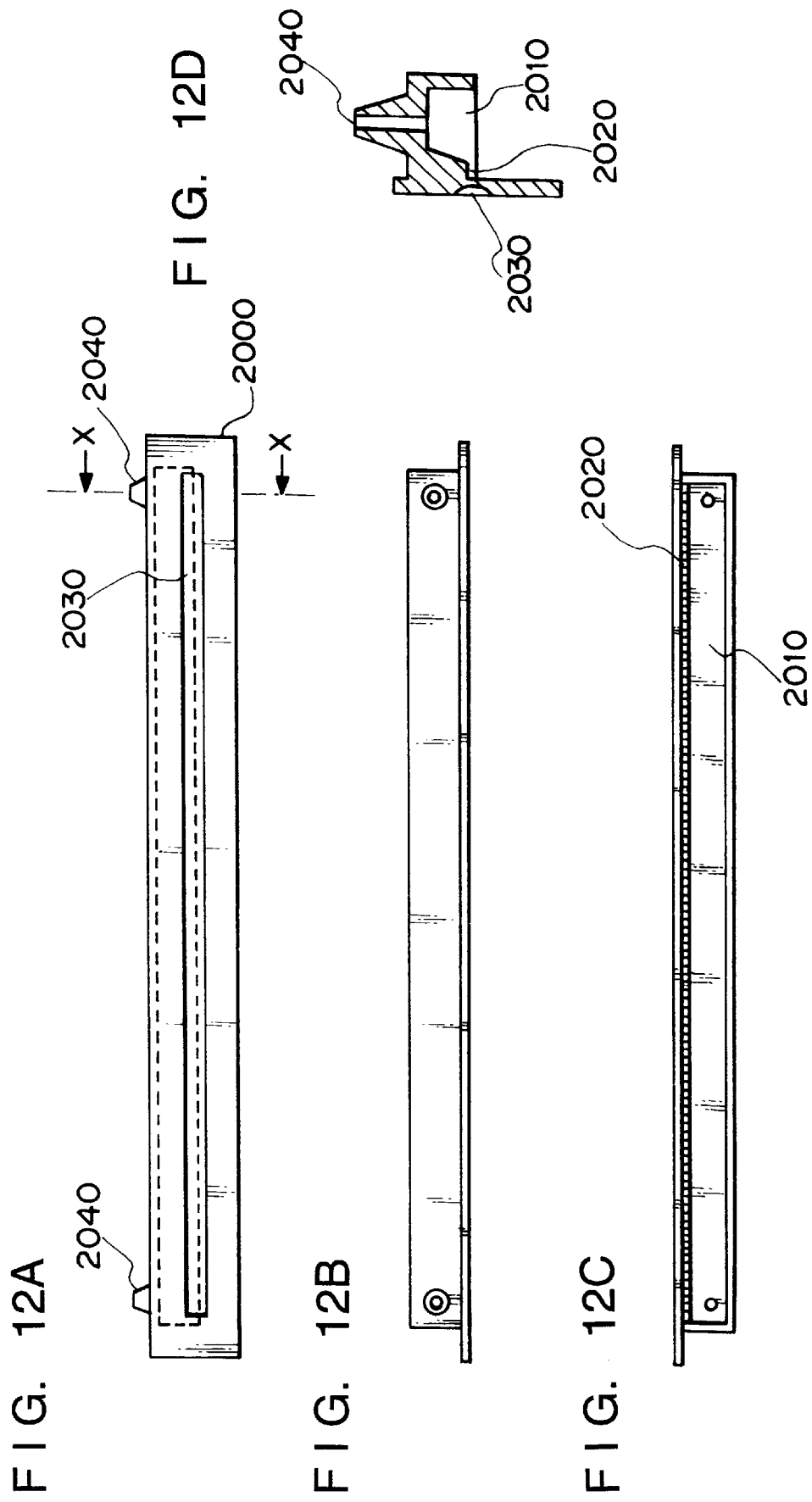
FIGS. 12A, 12B, 12C and 12D illustrate the shape of a grooved member.

FIGS. 12A–12D are diagrams showing the shape of the grooved member 2000. FIG. 12A is a front view in which the grooved member 2000 is seen from the front, FIG. 12B a top view in which FIG. 12A is seen from the top, FIG. 12C a bottom view in which FIG. 12A is seen from the bottom, and FIG. 12D a sectional view taken along line X—X of FIG. 12A.

In FIGS. 12A–12D, the grooved member 2000 is shown to have a flow pass or path 2020 provided to correspond to each discharge-energy generating element 1010 provided in the heater board 1000, an orifice 2030 corresponding to each flow pass 2020 and communicating with the flow pass 2020 for discharging ink toward the recording medium, a liquid chamber 2010 communicating with each flow pass 2020 in order to supply it with ink, and an ink supply port 2040 for feeding ink, which has been supplied from an ink tank (not shown), to the liquid chamber 2010. The grooved member 2000 naturally is formed to have a length large enough to substantially cover the row of discharge-energy generating devices arranged by lining up a plurality of the heater boards 1000.

With reference again to FIG. 10, the grooved member 2000 is joined to the heater boards 1000 in a state in which the positions of the flow passes 2020 of the grooved member 2000 are made to exactly coincide with the positions of the discharge-energy generating elements (heaters) 1010 on the heater boards 1000 arranged in a row on the base plate 3000.

Conceivable methods of joining the grooved member 2000 are a method in which the grooved member is pushed in mechanically using springs or the like, a method in which the grooved member 2000 is fixed by a bonding agent, and a method which is a combination of these methods.

Figure 13:
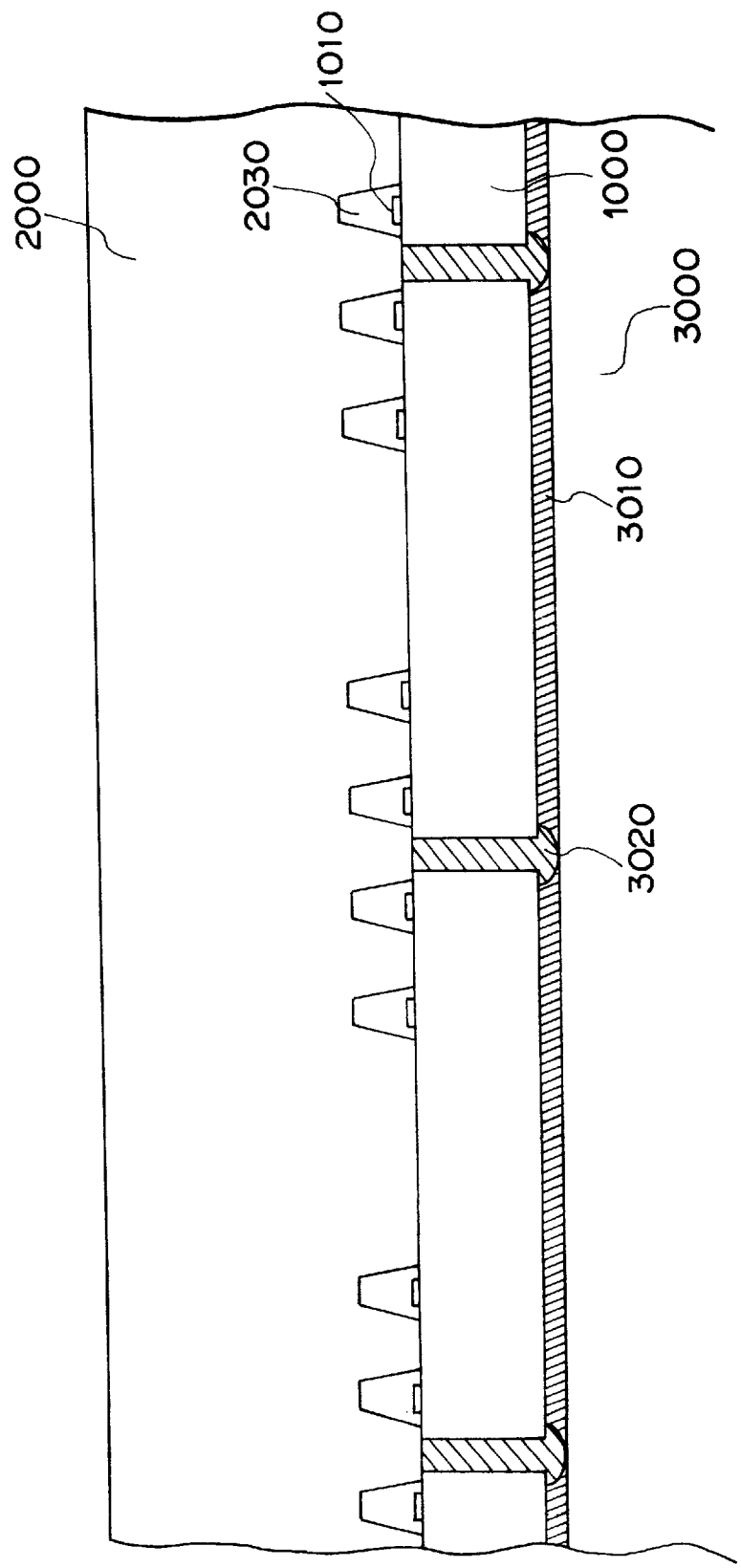
FIG. 13 is a diagram showing the grooved member and heater boards in a fixed state.

The grooved member 2000 and each of the heater boards 1000 are secured in the relationship shown in FIG. 13 by any of these methods.

The grooved member 2000 described above can be manufactured using well-known methods such as machining by cutting, a molding method, casting or a method relying upon photolithography.

FIG. 14 shows an example of drive circuitry provided on the heater board 1000 of the printhead. Numeral 100 denotes a base, 101 a logic block for selecting preheating pulses, 303 a latch for temporarily storing image data, 102 a selection-data saving latch, having the same circuit arrangement as the latch 303, for selecting preheating pulses, and 103 an OR gate for taking the OR of heating pulses and preheating pulses.

The operation of this drive circuitry will now be described in line with a driving sequence.

After power is introduced from a logic power source 309, preheating pulses are selected dependent upon the characteristic of the amount of ink discharged (per application of a pulse at a fixed temperature). The characteristic is measured in advance. Data of each nozzle (the data is identical for one or four nozzle(s)) for selecting the preheating pulses in dependence upon the aforesaid characteristic is saved in the selection-data saving latch 102 using a shift register 304 for entering image data serially. Since shared use is made of the shift register 304 for entering image data, it will suffice merely to increase the number of latch circuits and latch the outputs of the shift register 304 as input signals in parallel fashion, as shown at points a in FIG. 14. This makes it possible to prevent an increase in the surface area of the elements other than that of the latch circuits. Further, in a case where the number of preheating pulses is increased and the number of bits necessary for selection of the number of pulses surpasses the number of bits of the shift register 304, this can readily be dealt with if the latch 102 is made plural in number and a latch-clock input terminal 108 which decides latching is made plural in number, as shown at 108a–108h. It will suffice if the saving of data for selection of the preheating pulses is performed one time, such as when the printer is started up. The image-data transfer sequence will be performed exactly the same as conventionally even if this function is incorporated. Furthermore, an arrangement may be adopted in which the number of bits in logic block 101 and in the selection-data saving latch 102 is made one-fourth, the preheating pulses are selected in units of four nozzles and are supplied in units of four nozzles.

Entry of heating signals will now be described as a sequence with follows completion of the storing of saved data, representing the amount of ink discharge, for selection of preheating pulses.

A characterizing feature of this board is that a heating input terminal 106 and a plurality of preheating input terminals 107a–107h, which are used for changing the amount of ink discharged, are separately provided. First, a signal from the heating-resistor monitor 314 is fed back and a heating signal having a pulse width of an energy suited to discharge of ink in dependence upon the value of feedback is applied to the heating input terminal 106 from the side of the printing apparatus. Next, the pulse width and timing of each of the plurality of preheating signals are changed in dependence upon the value from the temperature sensor 315 and, at the same time, preheating signals are applied from the plurality of preheating pulse terminals 107a–107h in such a manner that the amount of ink discharged will vary under fixed temperature conditions. Thus, if a selection is made to deal with a factor other than temperature, namely a change in the amount of ink discharge of each nozzle, the amount of ink discharge can be rendered constant to eliminate unevenness and blurring. One of the plurality of preheating pulses thus entered is selected in dependence upon selection data saved in advance in the preheat selection logic block (latch) 102. Next, an AND signal between the image data and heating signal is OR-ed with a selected preheating pulse by the OR gate 103, and the resulting signal drives a power transistor 302, thereby passing an electric current through the heater 1010 to discharge ink.

Shown in FIG. 14 are an input signal input terminal 104, a clock input terminal 105, a latch signal input terminal 307, a ground terminal 310, a power-supply voltage input terminal 311 for heating purposes, an output terminal 312 for heating-resistor monitoring data, and an output terminal 313 for data indicating the temperature inside the printhead.

Figure 15:
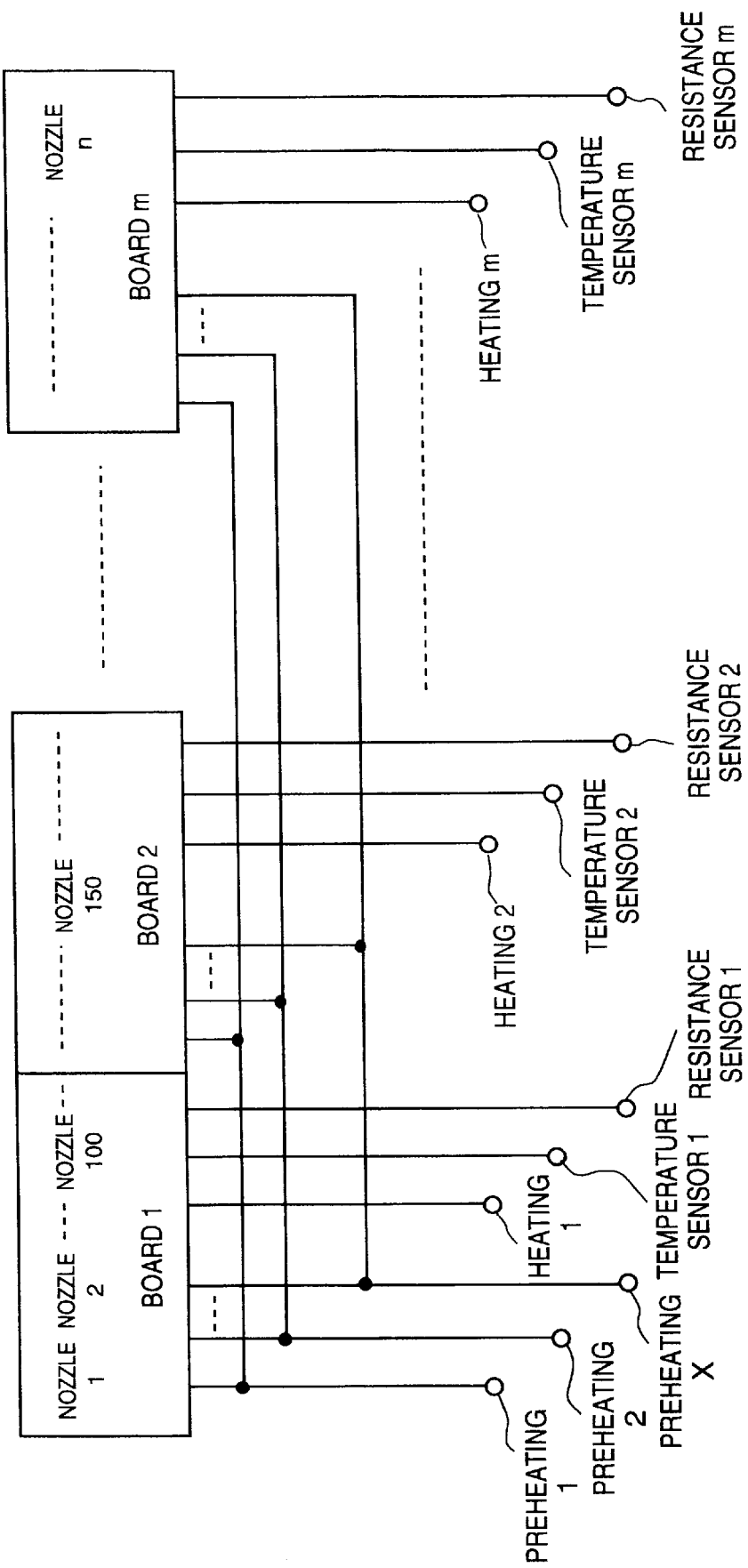
FIG. 15 is a block diagram showing a multiple-nozzle head constituted by an array of a plurality of heater boards.

Reference will be had to FIG. 15 to describe the construction of a multiple-nozzle head constituted by a plurality of the heater boards 1000 arranged in a row. There are m-number of boards in the row and a total of n-number of nozzles. The description will focus on nozzles 1, 100 of board 1 and nozzle 150 of board 2.

Figure 16:
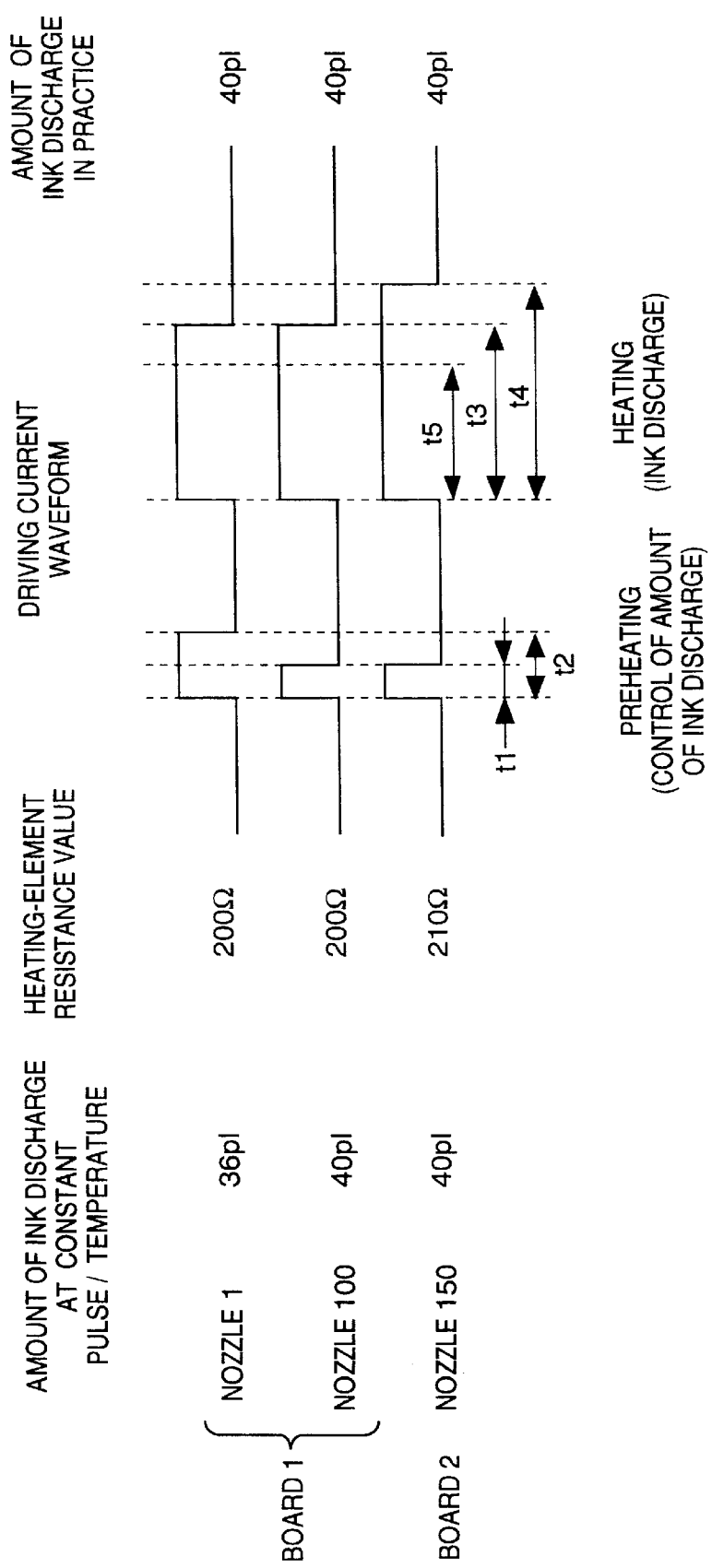
FIG. 16 is a diagram showing an example of control of driving current waveforms for driving the printing elements.

As shown in FIG. 16, assume that the amounts of ink discharged by nozzles 1, 100 and 150 are 36 pl, 40 pl and 40 pl, respectively, at application of a constant pulse width at a constant temperature. In such case, selection data having a level such that the amount of ink discharged will be greater for nozzle 1 than for nozzles 100, 150 is set in the selection-data saving latch. Since it is known from resistance sensors 1, 2 that 200 Ω is the heating-resistance value of board 1 and that 210 Ω is the heating-resistance value of board 2, as shown in FIG. 16, the pulse width applied to board 2 is made larger than that applied to board 1 so that the introduced power will be rendered uniform. FIG. 16 illustrates driving current waveforms applied under these conditions. It will be understood that the preheating pulse of nozzle 1 which discharges a small amount of ink has a pulse width larger than that of the preheating pulses for nozzles 100 and 150 (t1<t2). Further, the heating pulse width t4 is larger than t3 (t4>t3). In FIG. 16, t5 represents the pulse width for minimum power needed to foam the ink and cause the ink droplets to be discharged from the nozzles. The following relationships hold: t1, t2<t5 and t3, t4>t5.

Thus, the preheating pulses are changed under conditions in which the relations t1<t2; t1, t2<t5 hold with respect to a change in the temperature of the board during drive. As a result, the amount of ink discharged from each nozzle during actual drive can be made 40 pl at all times. This makes it possible to achieve high-quality printing without unevenness and blurring. Furthermore, with regard to the heating pulses exhibiting a high power, the pulse width is adjusted in dependence upon the resistance value of the board, whereby a constant power is applied without waste. This contributes to a longer service life for the printhead.

FIG. 17 illustrates a change in OD value in a case where the preheating pulses are changed.

In a case where there is a very large density unevenness between nozzles (e.g., a case where the amount of ink discharge of nozzle 200 at a constant pulse width and temperature is 32 pl, which is 20% less than the amount of ink discharge of nozzles 100 and 150, as shown in FIG. 18), the preheating pulses fluctuate by more than 0.5 μsec from the usual value, depending upon the particular case, owing to the correction. For example, if a drive pulse which is equivalent to a single heating pulse is on the order of 4 μsec, a pulse which is approximately 15% longer than usual is applied to a printing element discharging ink which represents a low density. This has the effect of shortening the service life of the printhead. Further, when the change in a heating pulse is large, the change in the OD value also becomes very large, as shown in FIG. 17.

Accordingly, in this embodiment, an interval (referred to as a quiescent interval) in which heating pulses are not applied is provided between preheating and main heating of the printhead, as shown in FIG. 18, thereby changing the printing density. As a result, there is no shortening in the life of the printhead. FIG. 19 illustrates a change in the OD value in a case where the preheating pulse width and main heating pulse width are fixed and the quiescent interval is changed.

As a result, if emphasis is placed upon a change in the quiescent interval and a printed dot which cannot be corrected within the range of this change is corrected utilizing the preheating pulses as well, then a large change in energy need not be applied to the printing elements of the printhead, the life of the printhead can be extended and the quality of a printing image can be improved.

In this embodiment, the application of drive pulses differs from that shown in FIG. 16 with regard particularly to nozzle 1 and nozzle 200, as shown in FIG. 18. With regard to nozzle 1, density is somewhat lower in comparison with nozzles 100 and 150 (the amount of reduction in ink discharge is 10%). Therefore, the quiescent interval is made slightly longer (t6) in comparison with that (t7) for nozzles 100 and 150. On the other hand, with regard to nozzle 200, there is a very large difference in density in comparison with nozzles 100 and 150 (the amount of reduction in ink discharge is 20%). Therefore, while the interval time is lengthened (t6), the preheating pulse width is stretched (t2) in comparison with the heating pulse width (t1) of nozzles 1, 100 and 150 to correct the amount in ink discharge. If this arrangement is adopted, a correction of density unevenness can be achieved without applying a large change in energy to the printing elements of the printhead.

Thus, in accordance with the present embodiment, the dots of prescribed pattern data, which have been printed by a printhead, are gathered together in a prescribed plurality of areas per each nozzle (printing element) of the printhead upon taking into account the visual discriminating ability of the human eye, and information obtained from the plurality of areas can be applied as density unevenness data. As a result, a variation in dot-to-dot diameter which exceeds the visual discriminating ability of the human eye is no longer discerned as density unevenness. In comparison with a case in which the dot diameter of each dot is discerned as density unevenness, information capable of accurate density correction can be supplied more rapidly for each printing element. As a result, it is possible to perform more rapid entry of fine correction data adapted to each printing element in the final stage of the printhead manufacturing process.

Furthermore, in a case where the amount of ink per printing operation discharged from each nozzle of the printhead is adjusted using the correction data obtained, the width of the quiescent interval between a preheating pulse and a main heating pulse is adjusted along with the pulse widths of these pulses. As a result, even if the amount of ink discharge fluctuates widely between nozzles under conditions of a constant pulse width or constant temperature, control can be performed so as to equalize the amount of ink discharge from one nozzle to the next without lengthening pulse width to such an extent that the printhead will be subjected to an abnormally large load. This makes it possible to prolong the life of the printhead while attaining a high image quality.

Furthermore, in a case where density unevenness for each dot is of significance, a correction parameter (preheating pulse width) for density correction is selected for each nozzle (printing element), based on a reference OD value obtained by taking characteristics of each printing unit of a printhead into consideration, in such a manner that an OD value becomes equal or close to the reference OD value, and control is made in such a manner that an appropriate preheating pulse is applied. As a result, density correction is more accurately performed, taking printing characteristics of a printhead into consideration.

In the description set forth above, it is mentioned that the preheating pulses are selected on the board. However, this does not impose a limitation upon the invention. For example, the density correction may be performed by changing the width of the main heating pulses using a counter or the like.

Furthermore, it goes without saying that the present invention may be applied to effect a density correction if the board is such that control of the driving power of each printing element is possible. The same density correction can be performed even if the printhead has a construction different from that described.

In the description given above, it is described that the control unit on the side of the printing apparatus controls the printing operation of the printhead on the basis of correction data that has been stored in a memory within the printhead. However, an arrangement may be adopted in which such a control unit is provided within the printhead.

Though a full-line printer has been taken as an example in the description given above, the invention is not limited to such a printer. For example, in a serial printer of the type in which printing is performed by moving a printhead mounted on a carriage, the invention is applicable to an arrangement in which the printing is carried out by a number of nozzles arrayed in a row in the direction in which the recording paper is conveyed. Also, this invention is applicable to another type of printhead such as an ink jet printhead, thermal printhead or LED printhead.

It goes without saying that equivalent effects are obtained even if there is a difference in the method of setting the driving power of each of the printing elements of the printhead.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558, 333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only an exchangeable chip type printhead, which can be electrically connected to the apparatus main unit and can receive an ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like,. is applicable to the present invention. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for correcting printing characteristics of a printhead having a plurality of printing elements and a memory for storing data, comprising:

printing means for applying plural types of signals to each of the printing elements of the printhead so as to print a printing pattern on a recording medium plural times, corresponding to the plural types;

selecting means for selecting one of the plural types of signals in units of a predetermined number of printing elements in such a manner that the printed image density by the selected signal is equal or close to a reference density determined based on a histogram reflecting a distribution on characteristic of each of the printing elements, obtained from the plural printed printing patterns; and transmitting means for transmitting the characteristics of the signal selected by said selecting means to the memory of the printhead.

2. The apparatus according to claim 1, further comprising:

characteristics acquiring means for acquiring characteristics of the printhead;

calculation means for calculating characteristics of a reference signal to be applied to the printhead so as to perform a printing operation, based on the characteristics;

second printing means for printing a second printing pattern on a recording medium, using the printhead by applying the reference signal to the printhead; and reference density acquiring means for acquiring the reference density based on the density distribution of the second printing pattern printed on the recording medium.

3. The apparatus according to claim 2, wherein the characteristics acquired by said characteristics acquiring means are characteristics of resistance.

4. The apparatus according to claim 2, wherein said reference density acquiring means statistically processes the density distribution of the second printing pattern, and regards the maximum, minimum, median, mean, mode, or value deviated by the variance from the mode in the density distribution, as the reference density.

5. The apparatus according to claim 1, wherein the plural types of signals which said printing means applies are signals, in double pulse width control, whose preheating pulse widths differ from each other.

6. The apparatus according to claim 1, wherein the predetermined number of printing elements is one.

7. The apparatus according to claim 1, wherein the predetermined number of printing elements is more than one.

8. The apparatus according to claim 1, wherein the histogram reflects an accumulated frequency with respect to each of optical density values.

9. A printhead corrected by a method of correcting printing characteristics, said printhead having a plurality of printing elements and a memory unit for storing data, said method comprising:

a printing step of applying plural types of signals to each of the printing elements of the printhead so as to print a printing pattern on a recording medium plural times, corresponding to the plural types;

a selecting step of selecting one of the plural types of signals in units of a predetermined number of printing elements in such a manner that the printed image density by the selected signal is equal or close to a reference density determined based on a histogram reflecting a distribution on characteristic of each of the printing elements, obtained from the plural printed printing patterns; and a transmitting step of transmitting the characteristics of the signal selected in said selecting step to the memory unit of the printhead.

10. The printhead according to claim 9, further comprising:

input means for externally entering printing data; and drive means for driving the plurality of printing elements based upon the printing data entered by said input means.

11. The printhead according to claim 9, wherein the memory unit includes an EEPROM.

12. The printhead according to claim 9, wherein the plurality of printing elements are included in each of a plurality of circuit boards, which are arrayed in a line.

13. The printhead according to claim 9, wherein the printhead is an ink-jet printhead which performs printing by discharging ink.

14. The printhead according to claim 9, wherein the printhead discharges ink by utilizing thermal energy, the printhead having a thermal energy transducer for generating thermal energy applied to the ink.

15. The printhead according to claim 9, wherein the histogram reflects an accumulated frequency with respect to each of optical density values.

16. The printhead according to claim 9, used in combination with a printing apparatus, said apparatus comprising:

receiving means for receiving correction data from the printhead;

generating means which, based on the correction data, generates a control signal for controlling operation of drive means, included in the printhead, for driving the plurality of printing elements in such a manner that the plurality of printing elements form uniform pixels; and transmitting means for transmitting the control signal to the printhead.

17. The printhead used in combination with the printing apparatus according to claim 16, wherein the printhead is an ink-jet printhead which performs printing by discharging ink.

18. The printhead used in combination with the printing apparatus according to claim 16, wherein the printhead discharges ink by utilizing thermal energy, the printhead having a thermal energy transducer for generating thermal energy applied to the ink.

19. The printhead used in combination with the printing apparatus according to claim 16, wherein the printhead is a full-line printhead, whose printing width is approximately the same as that of a recording medium.

20. The printhead used in combination with the printing apparatus according to claim 19, further comprising conveyance means for conveying the recording medium in a direction perpendicular to the printing direction of the printhead.

21. The printhead used in combination with the printing apparatus according to claim 20, wherein the recording medium conveyed by said conveyance means is a continuous sheet of paper.

22. A method of correcting printing characteristics of a printhead having a plurality of printing elements and a memory unit for storing data, said method comprising:

a printing step of applying plural types of signals to each of the printing elements of the printhead so as to print a printing pattern on a recording medium plural times, corresponding to the plural types;

a selecting step of selecting one of the plural types of signals in units of a predetermined number of printing elements in such a manner that the printed image density by the selected signal is equal or close to a reference density determined based on a histogram reflecting a distribution on characteristic of each of the printing elements, obtained from the plural printed printing patterns; and a transmitting step of transmitting the characteristics of the signal selected in said selecting step to the memory unit of the printhead.

23. The method according to claim 22, further comprising:

a characteristics acquiring step of acquiring characteristics of the printhead;

a calculation step of calculating characteristics of a reference signal to be applied to the printhead so as to perform printing operation, based on the characteristics;

a second printing step of printing a second printing pattern on a recording medium, using the printhead by applying the reference signal to the printhead; and a reference density acquiring step of acquiring the reference density based on the density distribution of the second printing pattern printed on the recording medium.

24. The method according to claim 22, wherein the histogram reflects an accumulated frequency with respect to each of optical density values.

* * * * *

UNITED STATES PATENT AND TRADEMARK OFFICE
CERTIFICATE OF CORRECTION

PATENT NO.    : 6,145,951

DATED         : November 14, 2000

INVENTOR(S)   : HAYASAKI ET AL.

It is certified that error appears in the above-identified patent and that said Letters Patent is hereby corrected as shown below:

On the Cover Page:
 Insert the following:
--[*]  Notice:   This patent issued on a continued prosecution application filed under 37 CFR 1.53(d), and is subject to the twenty year patent term provisions of 35 U.S.C. 154(a)(2).--.

[56] References Cited:
 FOREIGN PATENT DOCUMENTS, "2002009" should read --2-2009--, "4229278" should read --4-229278--, "4232749" should read --4-232749--, "5024192" should read --5-24192--, and "7242004" should read --7-242004--.

Signed and Sealed this

Twenty-second Day of May, 2001

Attest:

NICHOLAS P. GODICI

Attesting Officer

Acting Director of the United States Patent and Trademark Office